United States Patent
Nakamura

(10) Patent No.: US 12,330,526 B2
(45) Date of Patent: Jun. 17, 2025

(54) SERVER, VEHICLE, AND VEHICLE DIAGNOSIS METHOD

(71) Applicant: TOYOTA JIDOSHA KABUSHIKI KAISHA, Toyota (JP)

(72) Inventor: Toru Nakamura, Toyota (JP)

(73) Assignee: TOYOTA JIDOSHA KABUSHIKI KAISHA

( * ) Notice: Subject to any disclaimer, the term of this patent is extended or adjusted under 35 U.S.C. 154(b) by 848 days.

(21) Appl. No.: 17/519,680

(22) Filed: Nov. 5, 2021

(65) Prior Publication Data

US 2022/0194256 A1 Jun. 23, 2022

(30) Foreign Application Priority Data

Dec. 22, 2020 (JP) ................................ 2020-212368

(51) Int. Cl.
    *H02J 7/00* (2006.01)
    *B60L 53/66* (2019.01)
    *B60L 53/68* (2019.01)
    *H02J 7/14* (2006.01)

(52) U.S. Cl.
    CPC .............. *B60L 53/68* (2019.02); *B60L 53/66* (2019.02); *B60L 2240/72* (2013.01); *B60L 2240/80* (2013.01)

(58) Field of Classification Search
    CPC ...... B60L 53/68; B60L 53/66; B60L 2240/72; B60L 2240/80
    See application file for complete search history.

(56) References Cited

U.S. PATENT DOCUMENTS

| | | | |
|---|---|---|---|
| 9,180,783 B1* | 11/2015 | Penilla | B60L 53/68 |
| 11,148,551 B2* | 10/2021 | Quattrini, Jr. | B60L 58/12 |
| 2013/0320934 A1* | 12/2013 | Kobayashi | H02J 7/00041 |
| | | | 320/162 |
| 2014/0312839 A1* | 10/2014 | Uyeki | B60L 53/64 |
| | | | 320/109 |
| 2016/0083981 A1* | 3/2016 | Kondo | E05F 15/79 |
| | | | 49/31 |
| 2016/0266561 A1 | 9/2016 | Oono | |
| 2017/0129361 A1* | 5/2017 | Scaringe | H02J 7/14 |
| 2018/0134176 A1* | 5/2018 | Symanow | B60L 58/20 |
| 2018/0358839 A1* | 12/2018 | Perez | H02J 3/46 |
| 2019/0092176 A1* | 3/2019 | Uyeki | B60L 53/665 |

(Continued)

FOREIGN PATENT DOCUMENTS

| | | |
|---|---|---|
| CN | 110293871 A | 10/2019 |
| JP | 2016-171634 A | 9/2016 |
| JP | 2020-036503 A | 3/2020 |

*Primary Examiner* — Alexis B Pacheco

(74) *Attorney, Agent, or Firm* — Finnegan, Henderson, Farabow, Garrett, and Dunner, LLP

(57) ABSTRACT

A vehicle diagnosis method includes a) determining, when a subject vehicle including a power storage enters a chargeable state in which it can receive power feed from EVSE, whether or not charging of the power storage is started in the subject vehicle, b) determining whether or not timer-programmed charging has been set in the subject vehicle that has entered the chargeable state, and c) determining whether or not charging and discharging control of the power storage is being carried out in the subject vehicle under remote control based on a determination result in at least one of a) determining and b) determining.

9 Claims, 15 Drawing Sheets

(56) References Cited

U.S. PATENT DOCUMENTS

| | | | | |
|---|---|---|---|---|
| 2020/0376982 A1* | 12/2020 | Heatley | | H02J 7/0068 |
| 2021/0129689 A1* | 5/2021 | Nakamura | | B60L 53/34 |
| 2021/0138908 A1* | 5/2021 | Salter | | H02J 1/122 |

* cited by examiner

SERVER, VEHICLE, AND VEHICLE DIAGNOSIS METHOD

This nonprovisional application is based on Japanese Patent Application No. 2020-212368 filed with the Japan Patent Office on Dec. 22, 2020, the entire contents of which are hereby incorporated by reference.

BACKGROUND

Field

The present disclosure relates to a server, a vehicle, and a vehicle diagnosis method.

Description of the Background Art

For example, Japanese Patent Laying-Open No. 2016-171634 discloses an electric power supply system in which an energy management system (EMS) manages a schedule for power feed from a power grid to a vehicle. In this electric power supply system, when a vehicle including a power storage receives supply of electric power from the power grid to charge the power storage, two schedule management functions of a charging schedule management function of the vehicle and a power feed schedule management function of the EMS are selectively used such that they do not interfere with each other.

SUMMARY

A technique for remote control of a vehicle by a server outside the vehicle has recently attracted attention in the technical field of autonomous driving. Such a technique for remote control may be used in charging and discharging control of a power storage. For example, a server may remotely control a vehicle including a power storage and a wireless communication device through wireless communication to carry out charging and discharging control of the power storage for energy management. On the other hand, a server different from the server above may remotely control a vehicle including a power storage via an EMS to carry out charging and discharging control of the power storage for energy management. When one vehicle is simultaneously remotely controlled by two or more servers, commands from the servers may interfere with each other and charging and discharging control (and energy management) of the power storage may not appropriately be carried out.

Since the two servers may be owned by different owners (for example, companies to which the servers belong), interference between two or more remote control operations can desirably be suppressed without relying on coordination between the two servers.

As the technique for remote control is widely available, a vehicle may also remotely be controlled without a user being aware of that fact. In order to preclude malicious remote control, a user is desirably able to know whether or not the vehicle is remotely controlled.

The present disclosure was made to solve the problem above, and an object thereof is to suppress simultaneous charging and discharging control of a power storage by two or more remote control operations onto a vehicle including the power storage. Another object of the present disclosure is to provide a method of diagnosing whether or not a vehicle is remotely controlled and a server and a vehicle to which such a method is applied.

A server according to a first point of view of the present disclosure includes a first determination unit, a second determination unit, and a third determination unit shown below. The first determination unit is configured to determine, when a subject vehicle including a power storage enters a chargeable state in which power feed from a power feed facility outside the subject vehicle can be received, whether or not charging of the power storage is started in the subject vehicle. The second determination unit is configured to determine whether or not timer-programmed charging has been set in the subject vehicle that has entered the chargeable state. The third determination unit is configured to determine whether or not charging and discharging control of the power storage is being carried out under remote control in the subject vehicle based on at least one of a result of determination by the first determination unit and a result of determination by the second determination unit.

Charging of a power storage included in a vehicle with electric power supplied from the outside of the vehicle is also referred to as "external charging" below. Charging and discharging control under remote control of the power storage in the vehicle is also referred to as "external control." Determination by the third determination unit that charging and discharging control of the power storage is carried out under remote control is also referred to as "under external control." Determination by the third determination unit that charging and discharging control of the power storage is not carried out under remote control is also referred to as "not under external control."

A vehicle capable of carrying out immediate charging and timer-programmed charging has been known. Immediate charging refers to external charging started when a vehicle enters a chargeable state (that is, a state in which power feed from a power feed facility outside the vehicle can be received). Timer-programmed charging refers to external charging started when designated start time comes. Such a vehicle carries out immediate charging at the time when it enters the chargeable state while timer-programmed charging has not been set, whereas it does not carry out immediate charging even when it enters the chargeable state while timer-programmed charging has been set. While timer-programmed charging has been set in such a vehicle, timer-programmed charging is carried out at the time when time to start set timer-programmed charging comes.

For example, in contact charging, as a connector of a power cable connected to a power feed facility is connected to (plugged into) an inlet of the vehicle, the vehicle enters the chargeable state. In wireless charging, as alignment of a power transmission coil of a power feed facility and a power reception coil of a vehicle with each other is completed, the vehicle enters the chargeable state.

Timer-programmed charging is set in a vehicle by a user. For example, as the user programs charging by designating start time, timer-programmed charging is set in the vehicle. Any condition for quitting timer-programmed charging may be set. The user may designate time to quit. Alternatively, timer-programmed charging may end when a state of charge (SOC) of the power storage is equal to or higher than a prescribed SOC value. Alternatively, the user may stop timer-programmed charging.

In the server, the third determination unit determines whether or not a subject vehicle is under external control based on at least one of a result of determination (whether or not immediate charging is carried out) by the first determination unit and a result of determination (whether or not timer-programmed charging has been set) by the second determination unit. With such a server, whether or not the subject vehicle is under external control can be diagnosed. For example, when immediate charging is not carried out in the subject vehicle even when the subject vehicle enters the chargeable state in spite of the fact that timer-programmed charging has not been set in the subject vehicle, it is highly likely that charging and discharging control of the power storage in the subject vehicle is carried out under remote control. When the third determination unit determines that the subject vehicle has already been under external control by another server, by not allowing the server to carry out external control on the subject vehicle, two or more simultaneous external control operations (remote control operations) onto the subject vehicle can be suppressed.

The subject vehicle may be an electrically powered vehicle (which is also referred to as an "xEV" below). The xEV refers to a vehicle that uses electric power as the entirety or a part of its motive power source. The xEV includes a battery electric vehicle (BEV), a plug-in hybrid electric vehicle (PHEV), and a fuel cell electric vehicle (FCEV).

The third determination unit may be configured to determine, when the first determination unit determines that charging is started at the time when the subject vehicle enters the chargeable state, that charging and discharging control of the power storage is not being carried out under remote control in the subject vehicle.

When immediate charging is carried out at the time when the subject vehicle enters the chargeable state, it is highly likely that the subject vehicle is not under external control. According to the configuration, whether or not the subject vehicle is under external control can highly accurately be diagnosed.

The third determination unit may be configured to determine, when the second determination unit determines that timer-programmed charging has been set in the subject vehicle that has entered the chargeable state and charging of the power storage is started at time which is not time to start set timer-programmed charging, that charging and discharging control of the power storage is being carried out under remote control in the subject vehicle.

When charging is started at time which is not time to start timer-programmed charging while timer-programmed charging has been set in the subject vehicle, it is highly likely that the subject vehicle is under external control. According to the configuration, whether or not the subject vehicle is under external control can highly accurately be diagnosed.

The third determination unit may be configured to determine, when the second determination unit determines that timer-programmed charging has been set in the subject vehicle that has entered the chargeable state and charging of the power storage ends without a condition for quitting set timer-programmed charging being satisfied, that charging and discharging control of the power storage is being carried out under remote control in the subject vehicle.

When charging ends without a condition for quitting timer-programmed charging being satisfied while timer-programmed charging has been set in the subject vehicle, it is highly likely that the subject vehicle is under external control. According to the configuration, whether or not the subject vehicle is under external control can highly accurately be diagnosed.

The server may further include an error determination unit that determines whether or not a charging error that impedes charging of the power storage occurs in the subject vehicle. The third determination unit may be configured to determine, when a prescribed condition is satisfied, that charging and discharging control of the power storage is being carried out under remote control in the subject vehicle. The prescribed condition includes a condition that the first determination unit determines that charging is not started at the time when the subject vehicle enters the chargeable state, a condition that the second determination unit determines that timer-programmed charging has not been set in the subject vehicle that has entered the chargeable state, and a condition that the error determination unit determines that no charging error occurs in the subject vehicle.

In a case in which immediate charging is not carried out even when the subject vehicle enters the chargeable state while timer-programmed charging has not been set in the subject vehicle, a reason therefor may be a charging error rather than external control. The server determines whether or not the subject vehicle is under external control in consideration also of such possibility. With such a server, whether or not the subject vehicle is under external control can more highly accurately be diagnosed.

Determination as occurrence of a charging error by the error determination unit is also referred to as "presence of error" below. Determination as occurrence of no error by the error determination unit is also referred to as "absence of error."

The server may further include an error processing unit that performs, when the error determination unit determines that the charging error occurs, at least one of issuance of a notification and making of a record regarding occurrence of the charging error.

In the configuration, when the error determination unit makes determination as "presence of error," at least one of issuance of a notification and making of a record regarding occurrence of the charging error is carried out. The charging error can thus tend to be rectified early. The error processing unit may record the charging error in the subject vehicle or in the outside (for example, the server) of the vehicle. The error processing unit may notify a user of the subject vehicle of the charging error or notify the outside (for example, a user of the server) of the subject vehicle of the charging error.

The server may further include a charging and discharging control unit. A wireless communication device may be mounted on the subject vehicle. The server may be configured to wirelessly communicate with the subject vehicle through the wireless communication device. When the third determination unit determines that charging and discharging control of the power storage is not being carried out under remote control in the subject vehicle, the charging and discharging control unit carries out charging and discharging control of the power storage under remote control through wireless communication with the wireless communication device. When the third determination unit determines that charging and discharging control of the power storage is being carried out under remote control in the subject vehicle, the charging and discharging control unit does not carry out the charging and discharging control of the power storage under remote control.

The server determines whether or not charging and discharging control of the power storage is being carried out under remote control based on a result of determination (not under external control/under external control) by the third determination unit. According to the server, charging and discharging control of the power storage in the subject vehicle can be carried out under remote control while interference with another remote control operation is avoided.

The server may further include a selector and a charging and discharging control unit. The server may be configured to wirelessly communicate with a plurality of vehicles. Each of the plurality of vehicles may include a power storage and a wireless communication device. The selector selects one or more vehicles from among the plurality of vehicles. The charging and discharging control unit carries out charging and discharging control of the power storage of each vehicle selected by the selector, under remote control through wireless communication with the wireless communication device. The selector may be configured to preferentially select a vehicle for which determination that charging and discharging control of the power storage is not being carried out under remote control is made by the third determination unit, over a vehicle for which determination that charging and discharging control of the power storage is being carried out under remote control is made by the third determination unit. The selector may be configured not to select a vehicle for which determination that the charging error occurs is made by the error determination unit.

Since the server preferentially selects as an object to be under external control, a vehicle determined by the third determination unit as not being under external control, interference between remote control by the server and remote control by another server is suppressed. Since the vehicle for which determination as presence of error is made by the error determination unit is not selected as an object to be under external control in the server, a malfunction in external control due to the charging error is suppressed.

The selector may be configured to place, when there are a plurality of vehicles for which determination that charging and discharging control of the power storage is not being carried out under remote control is made by the third determination unit, higher priority in selection on a vehicle shorter in time elapsed since determination that charging and discharging control of the power storage is not being carried out under remote control was made.

When time elapses since determination as not being under external control was made in a certain vehicle by the third determination unit, the vehicle is more likely to be under external control during a period from that determination until the current time point. The server preferentially selects a vehicle shorter in time elapsed since determination by the third determination unit. Therefore, the vehicle less likely to be under external control can preferentially be selected.

The selector may be configured to set, when there are a plurality of vehicles for which determination that charging and discharging control of the power storage is not being carried out under remote control is made by the third determination unit, priority in selection for the plurality of vehicles based on a charging location for each of the plurality of vehicles.

Possibility of external control may vary depending on a charging location. For example, when the charging location is the home of the user of the vehicle, the vehicle is prone to external control. When the charging location is a workplace of the user of the vehicle, the vehicle may be less prone to external control. In the configuration, as priority in selection is set based on the charging location, a vehicle less likely to be under external control can preferentially be selected.

A server according to a second point of view of the present disclosure is configured to carry out, on a vehicle including a power storage and a wireless communication device, charging and discharging control of the power storage for energy management, under remote control through wireless communication with the wireless communication device. The server is configured to exclude, when charging of the power storage is not started even when the vehicle enters a chargeable state in which power feed from a power feed facility outside the vehicle can be received while timer-programmed charging has not been set in the vehicle, the vehicle from objects to be under charging and discharging control (that is, remote control through wireless communication).

As described previously, when immediate charging is not carried out even when the vehicle enters the chargeable state while timer-programmed charging has not been set in the vehicle, it is highly likely that charging and discharging control of the power storage is carried out under remote control in the vehicle or a charging error occurs. The server excludes such a vehicle from objects to be under external control. Interference between two or more remote control operations and a malfunction in external control due to a charging error are thus suppressed.

A vehicle according to a third point of view of the present disclosure includes a power storage and a controller that controls a terminal of a user of the vehicle. The controller in the vehicle includes a charging control unit, a first determination unit, a second determination unit, and a third determination unit shown below. The charging control unit is configured to start charging of the power storage when the vehicle enters a chargeable state in which power feed from a power feed facility outside the vehicle can be received while timer-programmed charging has not been set in the vehicle and to start charging of the power storage when time to start set timer-programmed charging comes while timer-programmed charging has been set in the vehicle. The first determination unit is configured to determine whether or not charging of the power storage is started in the vehicle when the vehicle enters the chargeable state. The second determination unit is configured to determine whether or not timer-programmed charging has been set in the vehicle that has entered the chargeable state. The third determination unit is configured to determine whether or not charging and discharging control of the power storage is being carried out under remote control in the vehicle based on at least one of a result of determination by the first determination unit and a result of determination by the second determination unit.

The vehicle includes the first to third determination units described previously. When immediate charging is not being carried out even when the subject vehicle enters the chargeable state in spite of the fact that timer-programmed charging has not been set in the vehicle, it is highly likely that the charging control unit is remotely controlled. According to the vehicle, whether or not the vehicle is externally controlled can be diagnosed.

The controller may be configured to control, when the third determination unit determines that charging and discharging control of the power storage is being carried out under remote control in the vehicle, the terminal of the user of the vehicle to be notified that the vehicle is remotely controlled.

In the vehicle, when the third determination unit makes determination as being under external control, the terminal of the user of the vehicle is notified of the fact that the vehicle is remotely controlled. The user thus readily knows whether or not the vehicle is remotely controlled.

The terminal of the user of the vehicle may be registered in advance in the controller. The terminal of the user of the vehicle may be a terminal mounted on the vehicle or a portable terminal carried by the user of the vehicle.

The power storage of the vehicle may be capable of contact charging. More specifically, the vehicle may further include an inlet. The vehicle may enter the chargeable state when a connector of a power cable connected to the power feed facility is connected to the inlet.

A vehicle diagnosis method according to a fourth point of view of the present disclosure includes a) determining, when a subject vehicle including a power storage enters a chargeable state in which power feed from a power feed facility outside the subject vehicle can be received, whether or not charging of the power storage is started in the subject vehicle, b) determining whether or not timer-programmed charging has been set in the subject vehicle that has entered the chargeable state, and c) determining whether or not charging and discharging control of the power storage is being carried out under remote control in the subject vehicle based on at least one of a result in a) determining and a result in b) determining.

According to the vehicle diagnosis method, similarly to the server described previously, whether or not the subject vehicle is externally controlled can be diagnosed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
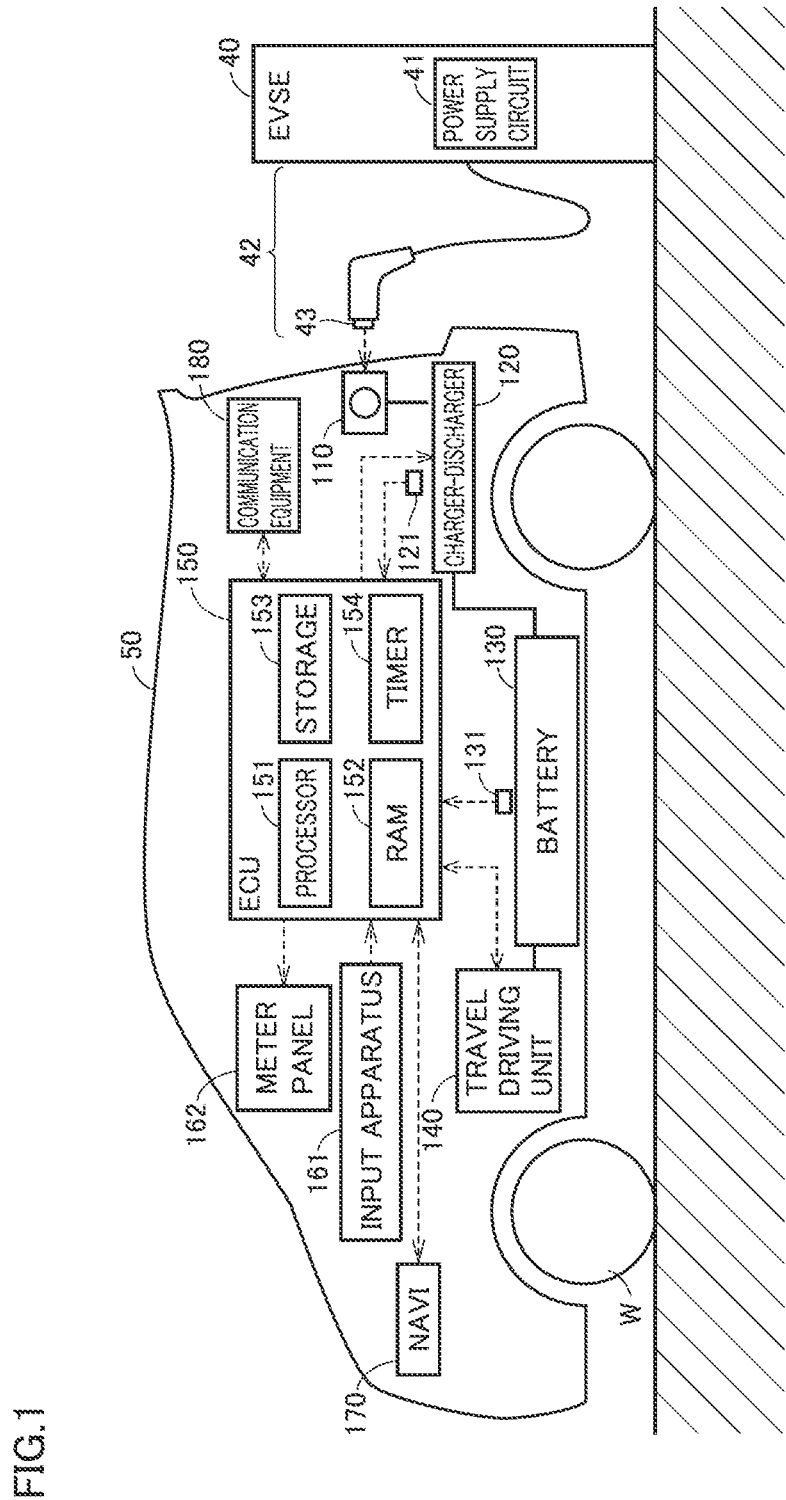
FIG. 1 is a diagram showing a configuration of a vehicle according to a first embodiment of the present disclosure.

An embodiment of the present disclosure will be described in detail below with reference to the drawings. The same or corresponding elements in the drawings have the same reference characters allotted and description thereof will not be repeated.

First Embodiment

FIG. 1 is a diagram showing a configuration of a vehicle 50 according to this embodiment. Referring to FIG. 1, vehicle 50 includes a battery 130 that stores electric power for traveling. Vehicle 50 can travel with electric power stored in battery 130. Vehicle 50 according to this embodiment is a battery electric vehicle (BEV) not including an engine (internal combustion engine).

Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of secondary batteries (which are generally also referred to as "cells") electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50.

Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. Monitoring module 131 may be a battery management system (BMS) that further performs, in addition to the sensor function, a state of charge (SOC) estimation function, a state of health (SOH) estimation function, a function to equalize a cell voltage, a diagnosis function, and a communication function. ECU 150 can obtain a state (for example, a temperature, a current, a voltage, an SOC, and an internal resistance) of battery 130 based on an output from monitoring module 131.

Electric vehicle supply equipment (EVSE) 40 corresponds to a power feed facility outside the vehicle. EVSE 40 includes a power supply circuit 41. A charging cable 42 is connected to EVSE 40. Charging cable 42 may always be connected to EVSE 40 or may be attachable to and removable from EVSE 40. Charging cable 42 includes a connector 43 at its tip end and contains a power line. Charging cable 42 according to this embodiment corresponds to an exemplary "power cable" according to the present disclosure.

Vehicle 50 includes an inlet 110 and a charger-discharger 120 for contact charging. Inlet 110 receives electric power supplied from the outside of vehicle 50. Inlet 110 is configured such that connector 43 of charging cable 42 can be connected thereto. As connector 43 of charging cable 42 connected to EVSE 40 is connected to (plugged into) inlet 110 of vehicle 50, vehicle 50 enters a chargeable state (that is, a state in which the vehicle can receive power feed from EVSE 40). Though FIG. 1 shows only inlet 110 and charger-discharger 120 adapted to a power feed type of EVSE 40, vehicle 50 may include a plurality of inlets so as to adapt to a plurality of types of power feed (for example, both of an alternating-current (AC) type and a direct-current (DC) type).

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter can be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state of charger-discharger 120 and outputs a result of detection to ECU 150. In this embodiment, monitoring module 121 detects a voltage and a current input to and output from the power conversion circuit. Monitoring module 121 detects charging power for battery 130.

Vehicle 50 in the chargeable state is capable of external charging (that is, charging of battery 130 with electric power supplied from EVSE 40) and external power feed (that is, power feed from vehicle 50 to EVSE 40). Electric power for external charging is supplied, for example, from EVSE 40 through charging cable 42 to inlet 110. Charger-discharger 120 converts electric power received at inlet 110 into electric power suitable for charging of battery 130 and outputs resultant electric power to battery 130. Electric power for external power feed is supplied from battery 130 to charger-discharger 120. Charger-discharger 120 converts electric power supplied from battery 130 into electric power suitable for external power feed and outputs resultant electric power to inlet 110. When any of external charging and external power feed is performed, the relay of charger-discharger 120 is closed (connected), and when neither of external charging and external power feed is performed, the relay of charger-discharger 120 is opened (disconnected).

ECU 150 includes a processor 151, a random access memory (RAM) 152, a storage 153, and a timer 154. A computer may be adopted as ECU 150. A central processing unit (CPU) may be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each pre-scribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 161, a meter panel 162, a navigation system (which is referred to as a "NAVI" below) 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a power control unit (PCU) and a motor generator (MG) which are not shown, and allows vehicle 50 to travel with electric power stored in battery 130. The PCU includes, for example, an inverter, a converter, and a relay (none of which is shown). The relay included in the PCU is referred to as a "system main relay (SMR)" below. The PCU is controlled by ECU 150. The MG is implemented, for example, by a three-phase AC motor generator. The MG is driven by the PCU and rotates drive wheel W. The PCU drives the MG with electric power supplied from battery 130. The MG performs regeneration and supplies regenerated electric power to battery 130. The SMR switches between connection and disconnection of an electric power path from battery 130 to the MG. The SMR is closed (connected) when vehicle 50 travels.

Input apparatus 161 accepts an input from a user. Input apparatus 161 is operated by a user and outputs a signal corresponding to the operation by the user to ECU 150. Examples of input apparatus 161 include various switches, various pointing devices, a keyboard, and a touch panel. Input apparatus 161 may include a smart speaker that accepts audio input.

Meter panel 162 shows information on vehicle 50. Meter panel 162 shows, for example, various types of information on vehicle 50 measured by various sensors mounted on vehicle 50. Information shown on meter panel 162 may include at least one of an outdoor temperature, a traveling speed of vehicle 50, an SOC of battery 130, average electric power consumption, and a travel distance of vehicle 50. Meter panel 162 is controlled by ECU 150. ECU 150 may have meter panel 162 show a message for a user or a warning indicator when a prescribed condition is satisfied.

NAVI 170 includes a processor, a storage, a touch panel display, and a global positioning system (GPS) module (none of which is shown). The storage stores map information. The touch panel display accepts an input from a user or shows a map and other types of information. The GPS module receives a signal (which is referred to as a "GPS signal" below) from a GPS satellite. NAVI 170 can identify a position of vehicle 50 based on a GPS signal. NAVI 170 conducts a path search for finding a travel route (for example, a shortest route) from the current position of vehicle 50 to a destination based on an input from the user, and shows the travel route found by the path search on a map.

Communication equipment 180 includes various communication interfaces (I/F). Communication equipment 180 includes a wireless communication device that wirelessly communicates with a server 30A (FIG. 2) which will be described later and a wired communication device that communicates through a wire with EVSE 40 (FIG. 2) which will be described later. Communication equipment 180 may include a data communication module (DCM). Communication equipment 180 may include a communication I/F adapted to the Fifth Generation Mobile Communication System (5G). ECU 150 communicates with a communication apparatus outside vehicle 50 through communication equipment 180. Communication equipment 180 according to this embodiment functions as the "wireless communication device" according to the present disclosure.

Figure 2:
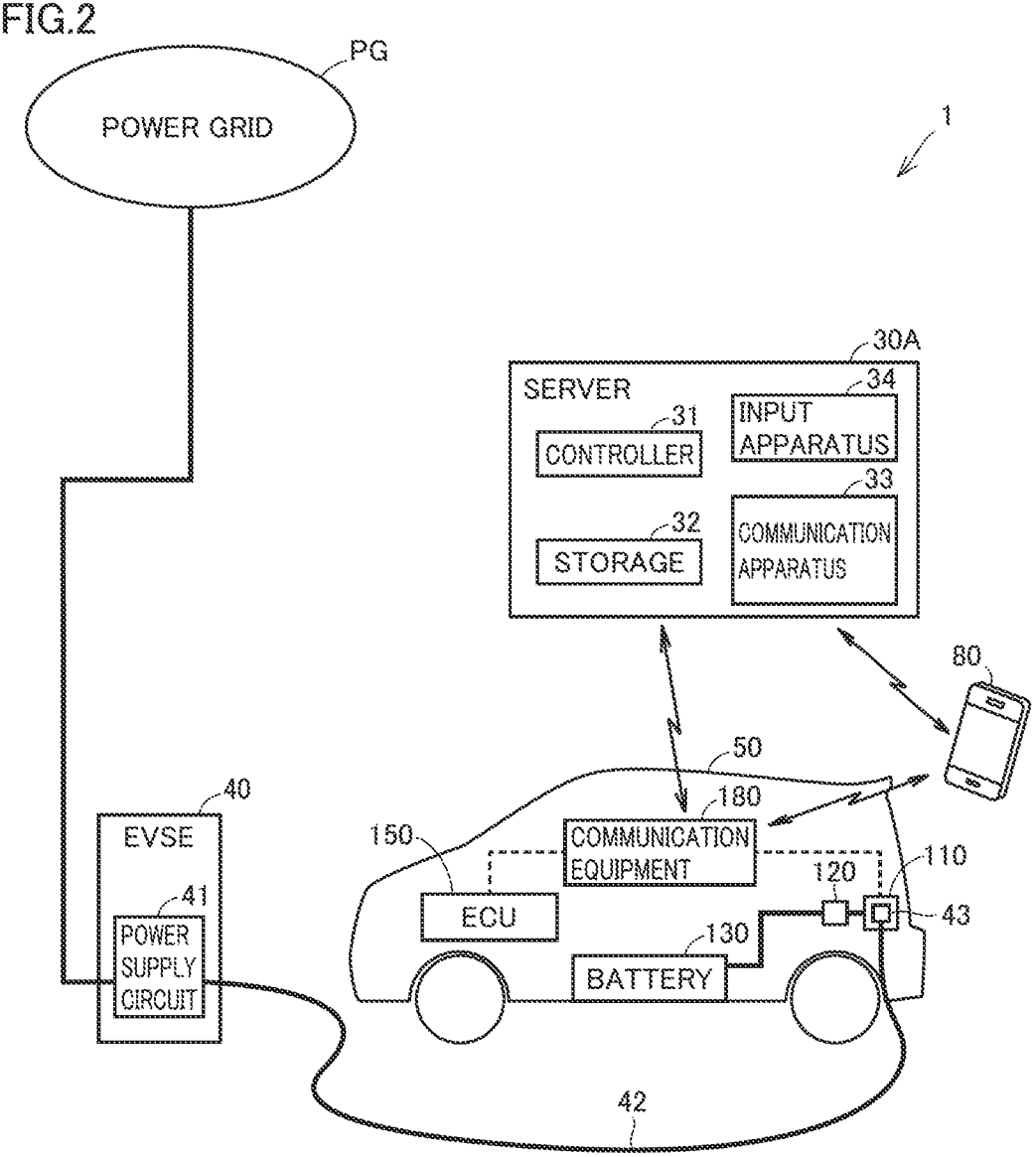
FIG. 2 is a diagram showing a server and a vehicle according to the first embodiment of the present disclosure.

FIG. 2 is a diagram showing a server and a vehicle according to this disclosure. Referring to FIG. 2, an electric power system 1 includes a power grid PG, server 30A, EVSE 40, vehicle 50, and a portable terminal 80. Vehicle 50 is configured as shown in FIG. 1. In this embodiment, an AC power feed facility that provides AC power is adopted as EVSE 40. Charger-discharger 120 includes a circuit adapted to the AC power feed facility. Without being limited to such a form, EVSE 40 may be a DC power feed facility that provides DC power. Charger-discharger 120 may include a circuit adapted to the DC power feed facility.

Portable terminal 80 corresponds to a terminal carried by a user of vehicle 50. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Power grid PG is a power network provided by an electric utility (for example, an electric power company). Power grid PG is electrically connected to a plurality of pieces of EVSE (including EVSE 40) and supplies AC power to each piece of EVSE. Power supply circuit 41 contained in EVSE 40 converts electric power supplied from power grid PG into electric power suitable for external charging. Power supply circuit 41 may include a sensor for detecting charging power.

As the relay of charger-discharger 120 is closed in vehicle 50 in the chargeable state, battery 130 is electrically connected to power grid PG. As electric power is supplied from power grid PG through power supply circuit 41, charging cable 42, and charger-discharger 120 to battery 130, battery 130 is externally charged.

Communication equipment 180 mounted on vehicle 50 communicates with EVSE 40 through charging cable 42. Communication between EVSE 40 and vehicle 50 may be of any type, and for example, controller area network (CAN) or power line communication (PLC) may be adopted. Standards of communication between EVSE 40 and vehicle 50 may be ISO/IEC15118 or IEC61851.

Communication equipment 180 mounted on vehicle 50 wirelessly communicates with server 30A, for example, through a mobile communication network (telematics). A protocol of communication between server 30A and vehicle 50 may be OpenADR. A signal exchanged between communication equipment 180 and server 30A may be encrypted. In this embodiment, communication equipment 180 and portable terminal 80 wirelessly communicate with each other. Communication equipment 180 and portable terminal 80 may communicate with each other through short-range communication such as Bluetooth® (for example, direct communication in a vehicle or within an area around the vehicle).

Prescribed application software (which is simply referred to as an "application" below) is installed in portable terminal 80. Portable terminal 80 is carried by a user of vehicle 50 and can exchange information with server 30A through the application. The user can operate the application, for example, through the touch panel display of portable terminal 80.

Server 30A includes a controller 31, a storage 32, a communication apparatus 33, and an input apparatus 34. A computer may be adopted as controller 31. Controller 31 includes a processor and a storage, performs prescribed information processing, and controls communication apparatus 33. Various types of information can be stored in storage 32. Communication apparatus 33 includes various communication I/Fs. Controller 31 communicates with the outside through communication apparatus 33. Input apparatus 34 accepts an input from a user. Input apparatus 34 provides the input from the user to controller 31.

Server 30A can communicate with each of vehicle 50 and portable terminal 80. Server 30A may communicate with EVSE 40. EVSE 40 may communicate with an EVSE management cloud. A protocol of communication between EVSE 40 and the EVSE management cloud may be open charge point protocol (OCPP).

In this embodiment, electric power system 1 functions as a virtual power plant (VPP). The VPP refers to a scheme in which a large number of distributed energy resources (which are also referred to as "DERs" below) are put together according to a sophisticated energy management technology that makes use of the Internet of Things (IoT) and the DERs are remotely controlled as being integrated as if the DER functioned as a single power plant. Exemplary DERs include energy resources possessed by each demand side (which are also referred to as demand side resources (DSR) below). In electric power system 1, the VPP is implemented by energy management using xEV (for example, vehicle 50 shown in FIG. 1).

Server 30A carries out charging and discharging control of battery 130 under remote control through wireless communication with communication equipment 180 (wireless communication device). Server 30A can manage energy (for example, adjustment of demand and supply in power grid PG) by such charging and discharging control.

Figure 3:
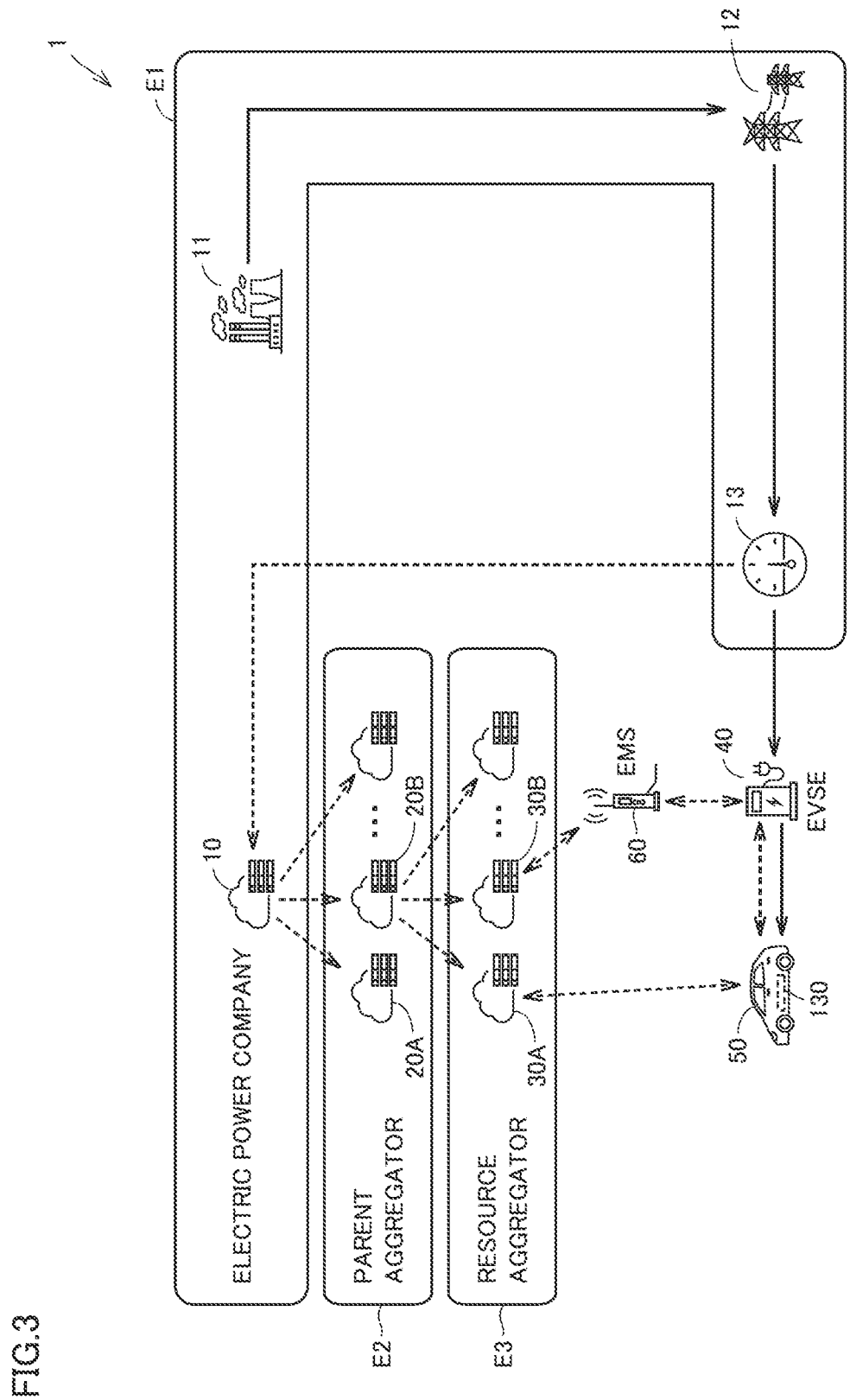
FIG. 3 is a diagram showing a schematic configuration of an electric power system according to the first embodiment of the present disclosure.

FIG. 3 is a diagram showing a schematic configuration of electric power system 1 according to this embodiment. Electric power system 1 is a vehicle grid integration (VGI) system. Electric power system 1 includes a plurality of xEVs and a plurality of pieces of EVSE (each one of them is shown in FIG. 3). Any independent number of xEVs and pieces of EVSE may be included in electric power system 1, and the number may be set to ten or more or one hundred or more. Electric power system 1 may include at least one of a POV and a MaaS vehicle. The POV is a personally owned vehicle. The MaaS vehicle is a vehicle managed by a mobility as a service (MaaS) entity. Electric power system 1 may include at least one of non-public EVSE that only a specific user is permitted to use (for example, home EVSE) and public EVSE that a large number of unspecified users are permitted to use. Portable terminal 80 shown in FIG. 2 is carried by each vehicle user. Server 30A in FIG. 3 is the same as server 30A in FIG. 2.

Referring to FIG. 3 together with FIG. 2, electric power system 1 includes an electric power company E1, a parent aggregator E2 that establishes contact with electric power company E1, and a resource aggregator E3 that establishes contact with a vehicle user.

Electric power company E1 serves as a power generation utility and a power transmission and distribution utility. Electric power company E1 constructs a power network (that is, power grid PG shown in FIG. 2) with a power plant 11 and a power transmission and distribution facility (T&D facility) 12 and maintains and manages power grid PG with a server 10 and a smart meter 13. Power plant 11 includes a power generator that generates electricity and supplies electric power generated by the power generator to T&D facility 12. Any system for power generation by power plant 11 is applicable. Any of thermal power generation, hydroelectric power generation, wind power generation, nuclear power generation, and solar photovoltaic power generation may be applicable as the system for power generation of power plant 11. T&D facility 12 includes a power transmission line, a substation, and an electricity distribution line and transmits and distributes electric power supplied from power plant 11. Smart meter 13 measures an amount of power usage each time a prescribed time period elapses (for example, each time thirty minutes elapse), stores the measured amount of power usage, and transmits the measured amount of power usage to server 10. Smart meter 13 is provided for each demand side (for example, an individual or a company) that uses electric power. Server 10 obtains the amount of power usage for each demand side from smart meter 13 of each demand side. Electric power company E1 may receive an electricity fee in accordance with the amount of power usage from each demand side. In this embodiment, the electric power company corresponds to a manager of power grid PG.

An electric utility that puts the DER together to provide an energy management service is referred to as an "aggregator." Electric power company E1, for example, in coordination with an aggregator, can adjust electric power of power grid PG. Parent aggregator E2 includes a plurality of servers (for example, servers 20A and 20B). Servers included in parent aggregator E2 belong to different utilities. Resource aggregator E3 includes a plurality of servers (for example, servers 30A and 30B). Servers included in resource aggregator E3 belong to different utilities. Servers included in parent aggregator E2 will be referred to as a "server 20" below and servers included in resource aggregator E3 will be referred to as a "server 30" below unless they are described as being distinguished from each other. Any independent number of servers 20 and servers 30 may be provided, and the number may be set to five or more or thirty or more.

In this embodiment, a single server 10 issues a request for energy management to a plurality of servers 20 and each server 20 that has received the request from server 10 issues a request for energy management to a plurality of servers 30. Furthermore, each server 30 that has received the request from server 20 issues a request for energy management to a plurality of vehicle users. Electric power company E1 can issue a request for energy management to a large number of demand sides (for example, vehicle users) using such a hierarchical structure (tree structure). The request may be issued by demand response (DR).

When server 30 receives a request for energy management from server 20, server 30 selects VPP cooperative vehicles in number necessary for meeting the request. The VPP cooperative vehicle is an xEV that cooperates in energy management. The VPP cooperative vehicle is selected from among xEVs belonging to users who have signed a contract with an aggregator in advance. A user who has signed the contract can be rewarded with a prescribed incentive by carrying out charging and discharging in accordance with a request from the aggregator. A prescribed penalty is imposed based on the contract, on a user who did not meet the request in spite of his/her approval to meet the request.

In this embodiment, when selection of the VPP cooperative vehicle ends, server 30 transmits a charging and discharging command (more specifically, a command to have the VPP cooperative vehicle carry out charging and discharging control) to each VPP cooperative vehicle. In response to this charging and discharging command, energy management in accordance with the request from server 20 (for example, adjustment of demand and supply in power grid PG) is carried out.

Server 30 measures an amount of power adjustment (for example, an amount of charging power and/or an amount of discharging power for a prescribed period) for each VPP cooperative vehicle with a prescribed wattmeter. The prescribed wattmeter may be smart meter 13 or a wattmeter (for example, monitoring module 121 shown in FIG. 1) mounted on the VPP cooperative vehicle. The wattmeter may be provided at any location. The wattmeter may be contained in EVSE 40. The wattmeter may be attached to a portable charging cable.

In electric power system 1 shown in FIG. 3, server 30B does not directly communicate with vehicle 50. In other words, server 30B does not wirelessly communicate with vehicle 50. Server 30B communicates with vehicle 50 with an energy management system (EMS) 60 being interposed. EMS 60 is, for example, a home EMS (HEMS). Without being limited as such, EMS 60 may be a factory EMS (FEMS) or a building EMS (BEMS). Server 30B carries out charging and discharging control of battery 130 by remotely controlling vehicle 50 with the EMS being interposed when it receives a request for energy management from server 20. Server 30B may be a server belonging to a house building company or an electric machinery manufacturer.

Server 30A carries out charging and discharging control of battery 130 by remotely controlling vehicle 50 through wireless communication when it receives the request for energy management from server 20 (see FIG. 2). Server 30A may be a server belonging to an automobile manufacturer.

In electric power system 1 as above, a single vehicle 50 may simultaneously remotely be controlled by two or more servers (for example, servers 30A and 30B). When a single vehicle is simultaneously remotely controlled by two or more servers, commands from the servers may interfere with each other and energy management may not appropriately be carried out. Then, with a configuration which will be described below, server 30A according to this embodiment suppresses two or more simultaneous external control (remote control) operations onto vehicle 50.

Figure 4:
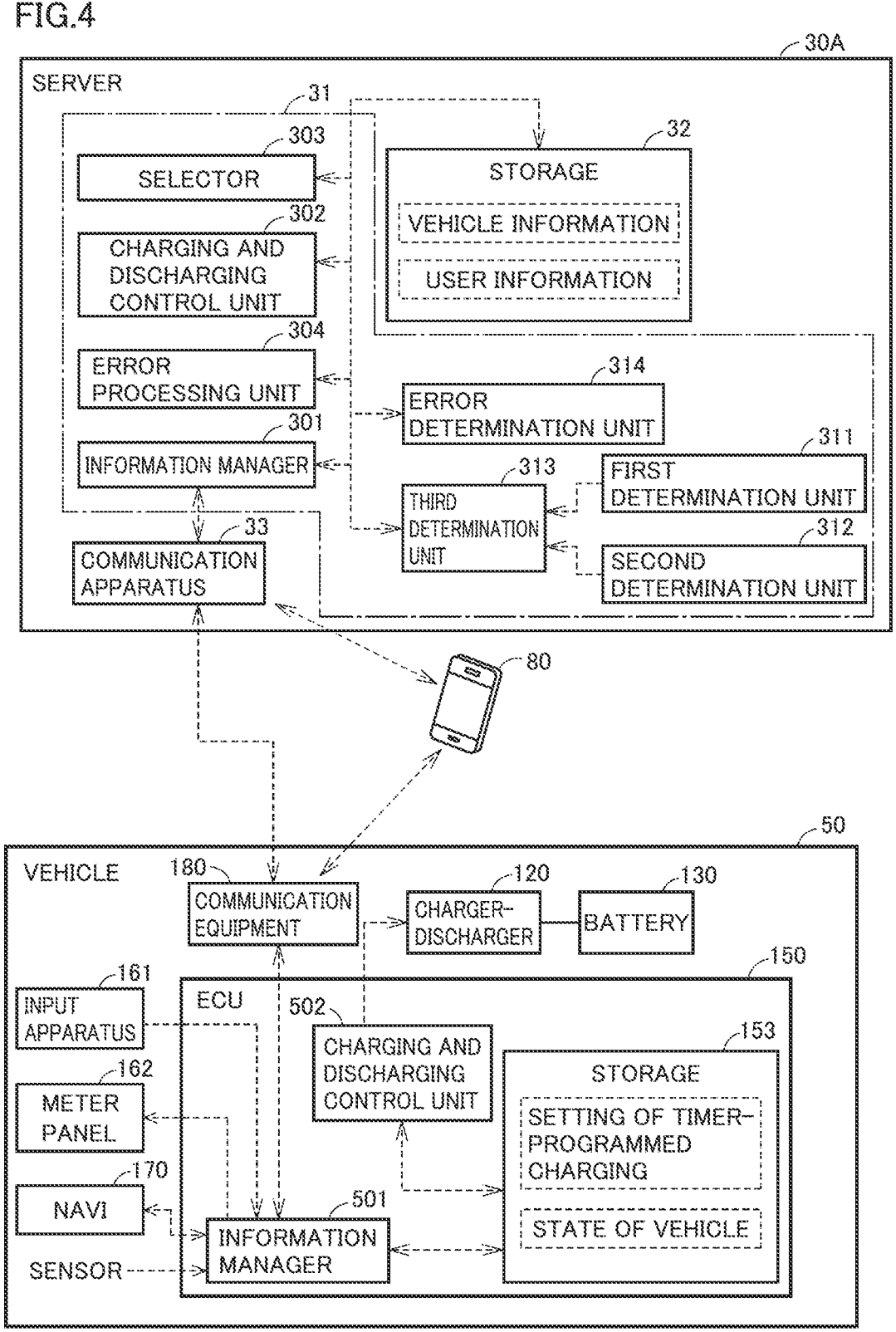
FIG. 4 is a diagram showing a detailed configuration of the server according to the first embodiment of the present disclosure.

FIG. 4 is a diagram showing a detailed configuration of server 30A. Referring to FIG. 4, controller 31 includes an information manager 301, a charging and discharging control unit 302, a selector 303, an error processing unit 304, a first determination unit 311, a second determination unit 312, a third determination unit 313, and an error determination unit 314. In controller 31 according to this embodiment, each unit is implemented by a processor and a program executed by the processor (more specifically, a program stored in a storage). Without being limited as such, each unit may be implemented by dedicated hardware (electronic circuitry).

Information manager 301 manages information on each registered user (which is also referred to as "user information" below) and information on each registered vehicle (which is also referred to as "vehicle information" below). The user information and the vehicle information are stored in storage 32. Identification information (which is also referred to as a "user ID" below) for identifying a user is provided for each user and information manager 301 manages the user information as being distinguished based on the user ID. The user ID functions also as information (terminal ID) for identifying a portable terminal carried by a user. Identification information (vehicle ID) for identifying a vehicle is provided for each vehicle and information manager 301 manages vehicle information as being distinguished based on the vehicle ID. The vehicle ID may be a vehicle identification number (VIN).

The user information includes a communication address of a portable terminal carried by a user and information (vehicle ID) for identifying a vehicle belonging to the user. The vehicle information includes a communication address of a wireless communication device mounted on the vehicle and information received from the vehicle (for example, information representing a position and a state of the vehicle). The vehicle information includes also a result in each of third determination and error determination which will be described later. Controller 31 may be configured to allow the user to update the user information and the vehicle information in storage 32 through input apparatus 34.

First determination unit 311 is configured to determine whether or not charging (immediate charging) of battery 130 is started in vehicle 50 when vehicle 50 enters the chargeable state. Second determination unit 312 is configured to determine whether or not timer-programmed charging has been set in vehicle 50 that has entered the chargeable state. Determination by first determination unit 311 and determination by second determination unit 312 are also referred to as "first determination" and "second determination" below, respectively. Charging control (including immediate charging and timer-programmed charging) in vehicle 50 will be described later.

Error determination unit 314 is configured to determine whether or not a charging error that impedes charging of battery 130 in vehicle 50 occurs. Examples of the charging error include abnormality of charger-discharger 120 or battery 130. Abnormality of battery 130 includes restriction on charging of battery 130 due to a temperature of battery 130 being out of an appropriate range. When at least one of charger-discharger 120 and battery 130 is abnormal, charging of battery 130 is not carried out in vehicle 50. Determination by error determination unit 314 is also referred to as "error determination" below.

Third determination unit 313 is configured to determine whether or not vehicle 50 is under external control based on at least one determination result in first determination, second determination, and error determination. Being under external control and not being under external control mean a state that vehicle 50 is under external control and a state that vehicle 50 is not under external control, respectively. External control is charging and discharging control of battery 130 carried out under remote control from the outside of vehicle 50. Determination by third determination 313 is also referred to as "third determination" below. In this embodiment, third determination unit 313 makes third determination as shown below.

When determination as YES is made (that is, vehicle 50 is determined as having carried out immediate charging) in first determination, third determination unit 313 makes determination as "not under external control." When determination as YES (that is, timer-programmed charging having been set in vehicle 50) is made in second determination and when charging of battery 130 is started at time which is not time to start set timer-programmed charging, third determination unit 313 makes determination as "under external control." When determination as NO (that is, immediate charging not being carried out in vehicle 50) is made in first determination, when determination as NO (that is, timer-programmed charging not having been set in vehicle 50) is made in second determination, and when determination as "absence of error" (that is, occurrence of no charging error in vehicle 50) is made in error determination, third determination unit 313 makes determination as "under external control." Third determination unit 313 has a result in third determination stored in storage 32.

Error processing unit 304 is configured to perform prescribed error processing when determination as "presence of error" (that is, occurrence of a charging error in vehicle 50) is made in error determination. Prescribed error processing refers, for example, to a notification and a record to the effect that the charging error occurs. Error processing unit 304 may carry out only one of issuance of a notification and making of a record.

Selector 303 is configured to select one or more vehicles from among a plurality of vehicles. More specifically, when selector 303 receives a request for energy management, it selects a VPP cooperative vehicle for meeting the request from a prescribed vehicle group (which is denoted as a "group G" below). Group G includes a plurality of xEVs configured similarly to vehicle 50 (see FIG. 1). Each xEV included in group G is registered in server 30A. Though details will be described later (see FIG. 11), selector 303 is configured to preferentially select an xEV determined as "not under external control" in third determination over an xEV determined as "under external control" in third determination. Selector 303 is configured to set, when there are a plurality of xEVs determined as "not under external control" in third determination, priority in selection for the plurality of xEVs based on a charging location of each of the plurality of xEVs. Selector 303 is configured not to select an xEV for which determination as "presence of error" is made in error determination.

Charging and discharging control unit 302 is configured to carry out charging and discharging control of the power storage of each VPP cooperative vehicle, under remote control through wireless communication with the wireless communication device. For example, when the VPP cooperative vehicle is vehicle 50, charging and discharging control unit 302 carries out charging and discharging control of battery 130, under remote control through wireless communication with communication equipment 180.

ECU 150 mounted on vehicle 50 includes an information manager 501 and a charging and discharging control unit 502. In ECU 150 according to this embodiment, each unit is implemented by processor 151 shown in FIG. 1 and a program executed by processor 151 (more specifically, a program stored in storage 153). Without being limited as such, each unit may be implemented by dedicated hardware (electronic circuitry).

Information manager 501 obtains a state of vehicle 50 based on outputs from various sensors mounted on vehicle 50. Information manager 501 obtains a position of vehicle 50 from NAVI 170. Information manager 501 has a state of vehicle 50 recorded in storage 153 in association with the position of vehicle 50. Information manager 501 transmits the current position and state of vehicle 50 to server 30A at prescribed timing or in response to a request from server 30A. The state of vehicle 50 transmitted from vehicle 50 to server 30A includes a state of connection (connection/disconnection) of inlet 110, a state of setting of timer-programmed charging (not set/set), and the SOC of battery 130. Information manager 501 may transmit the current position and state of vehicle 50 to server 30A at timing when the state of connection of inlet 110 makes transition from disconnection to connection (that is, timing of plugging into inlet 110).

Charging and discharging control unit 502 is configured to carry out charging and discharging control of battery 130 by controlling charger-discharger 120. When vehicle 50 enters the chargeable state while timer-programmed charging has not been set, charging and discharging control unit 502 starts external charging (immediate charging). Charging and discharging control unit 502 does not carry out immediate charging while timer-programmed charging has been set in vehicle 50. The user of vehicle 50 can set timer-programmed charging in vehicle 50 (more specifically, ECU 150) by operating a user terminal (for example, input apparatus 161 or portable terminal 80). As the user programs charging by designating start time, timer-programmed charging is set in vehicle 50. Setting of timer-programmed charging (including start time) is stored in storage 153. When time to start set timer-programmed charging comes in vehicle 50 in the chargeable state, charging and discharging control unit 502 starts external charging (timer-programmed charging). Charging and discharging control unit 502 is configured to quit charging when a prescribed quitting condition is satisfied during charging.

Figure 5:
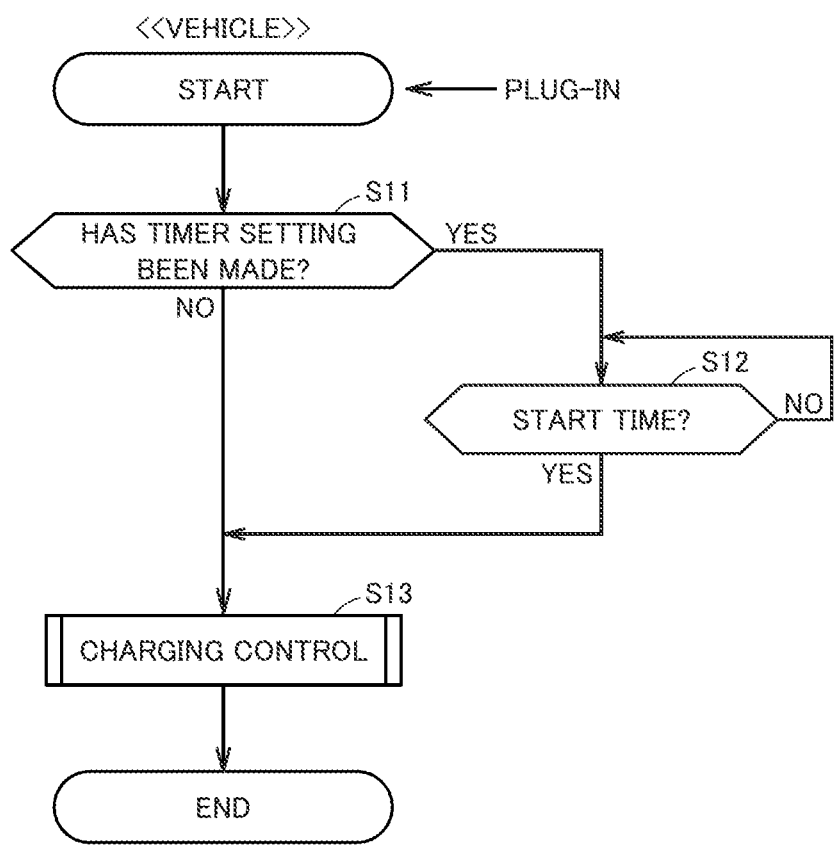
FIG. 5 is a flowchart showing processing involved with charging control carried out by a controller of the vehicle according to the first embodiment of the present disclosure.

FIG. 5 is a flowchart showing processing involved with charging control carried out by ECU 150 of vehicle 50. Processing shown in this flowchart is started when vehicle 50 enters the chargeable state. In this embodiment, when a connector is connected to (plugged into) inlet 110 (FIG. 1), vehicle 50 enters the chargeable state.

Referring to FIG. 5 together with FIG. 4, in a step (which is simply denoted as "S" below) 11, charging and discharging control unit 502 determines whether or not timer-programmed charging has been set in vehicle 50. When timer-programmed charging has not been set in vehicle 50 (NO in step S11), the process proceeds to S13.

Figure 6:
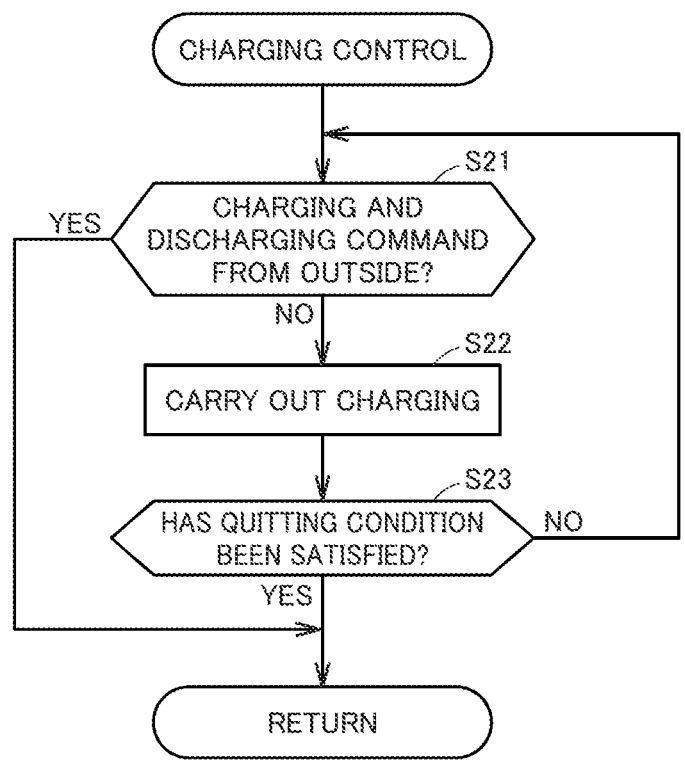
FIG. 6 is a flowchart showing details of charging control shown in FIG. 5.

FIG. 6 is a flowchart showing processing involved with S13 in FIG. 5. Referring FIG. 6 together with FIG. 4, in S21, charging and discharging control unit 502 determines whether or not vehicle 50 receives a charging and discharging command from the outside. When vehicle 50 does not receive the charging and discharging command from the outside (NO in S21), battery 130 is charged in S22 and S23. When vehicle 50 receives the charging and discharging command from the outside (YES in S21), a series of processing shown in FIG. 6 ends. When vehicle 50 receives the charging and discharging command from the outside, charging and discharging of battery 130 is carried out through processing shown in FIG. 7 which will be described later.

In S22, charging and discharging control unit 502 controls charger-discharger 120 to carry out charging of battery 130. In S23, charging and discharging control unit 502 determines whether or not a prescribed quitting condition (which is also referred to as a "charging quitting condition" below) is satisfied. In this embodiment, the charging quitting condition is satisfied when a state of charge (SOC) of battery 130 is equal to or higher than a prescribed SOC value (for example, an SOC value indicating full charge). Without being limited as such, the charging quitting condition can be modified as appropriate. For example, the charging quitting condition may be satisfied when prescribed time to end comes. Alternatively, the charging quitting condition may be satisfied when a user performs a prescribed operation to quit onto EVSE 40, input apparatus 161, or portable terminal 80.

While determination as NO (not satisfied) is made in S23, S21 to S23 are repeated. When the charging quitting condition is satisfied (YES in S23), the series of processing shown in FIG. 6 (that is, S13 in FIG. 5) ends and a series of processing shown in FIG. 5 ends. When vehicle 50 in a state in which it does not receive the charging and discharging command from the outside and timer-programmed charging has not been set enters the chargeable state as above, external charging is started. This external charging corresponds to immediate charging.

Referring again to FIG. 5 together with FIG. 4, when timer-programmed charging has been set in vehicle 50 (YES in S11), the process proceeds to S12. In S12, charging and discharging control unit 502 determines whether or not time to start set timer-programmed charging has come. Charging and discharging control unit 502 repeats determination in S12 until time to start timer-programmed charging comes. When time to start timer-programmed charging comes (YES in S12), in S13, charging and discharging control unit 502 performs the processing shown in FIG. 6. Thus, when time to start set timer-programmed charging comes in vehicle 50 in which timer-programmed charging has been set and which does not receive the charging and discharging command from the outside and enters the chargeable state, external charging is started. This external charging corresponds to timer-programmed charging. Charging quitting conditions (S23 in FIG. 6) different between immediate charging and timer-programmed charging may be set.

Figure 7:
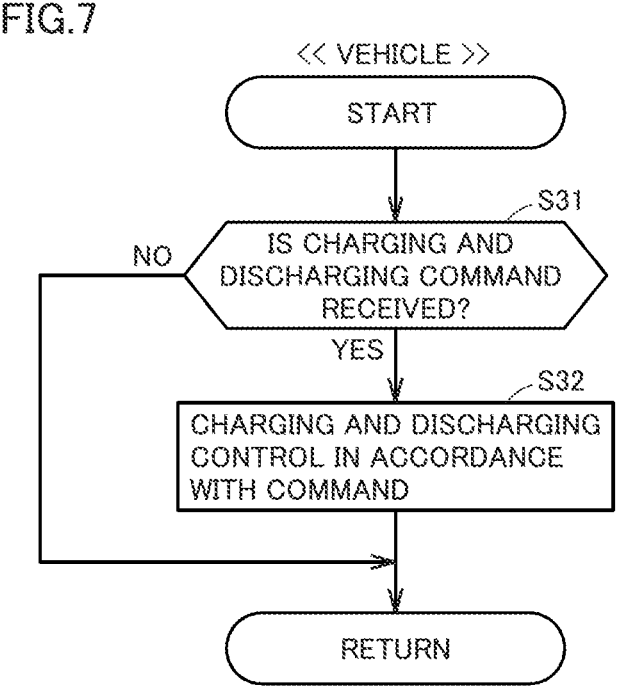
FIG. 7 is a flowchart showing charging control carried out under remote control by the controller of the vehicle according to the first embodiment of the present disclosure.

FIG. 7 is a flowchart showing charging control carried out under remote control by ECU 150 of vehicle 50. Processing shown in this flowchart is repeatedly performed while vehicle 50 is in the chargeable state. ECU 150 performs processing shown in FIG. 7 in parallel to the processing shown in FIG. 5.

Referring to FIG. 7 together with FIG. 4, in S31, charging and discharging control unit 502 determines whether or not vehicle 50 receives the charging and discharging command from the outside. When vehicle 50 does not receive the charging and discharging command from the outside (NO in S31), the process returns to the initial step (S31). When vehicle 50 receives the charging and discharging command from the outside (YES in S31), in S32, charging and discharging control unit 502 controls charger-discharger 120 in accordance with the charging and discharging command. Charging and discharging control of battery 130 under remote control is thus carried out. This charging and discharging control corresponds to external control. As set forth above, vehicle 50 is configured to permit charging and discharging control of battery 130 under remote control. Upon receiving the charging and discharging command, for example, from server 30A, charging and discharging control unit 502 carries out charging and discharging control of battery 130 in accordance with the charging and discharging command. Charging and discharging control unit 502 does not follow a malicious charging and discharging command (for example, a command from a terminal that has maliciously logged in). Charging and discharging control unit 502 may distinguish between a proper charging and discharging command and a malicious charging and discharging command based on prescribed authentication.

Figure 8:
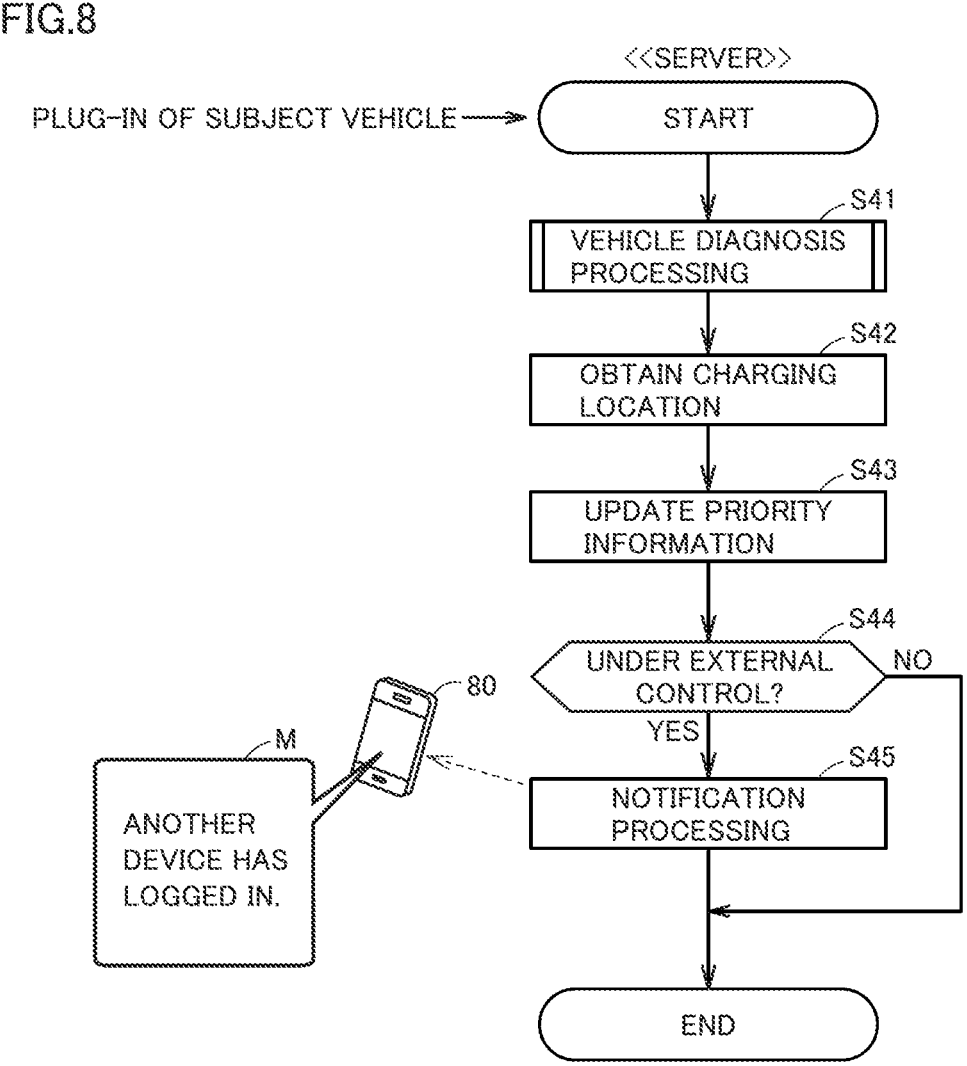
FIG. 8 is a flowchart showing processing involved with vehicle management by the server according to the first embodiment of the present disclosure.

FIG. 8 is a flowchart showing processing involved with vehicle management by server 30A. Processing shown in this flowchart is started when a subject vehicle enters the chargeable state. An example in which the subject vehicle is vehicle 50 will be described below. Processing shown in FIG. 8 is performed for each xEV included in group G. The processing shown in FIG. 8 may be performed concurrently for a plurality of xEVs.

Figure 9:
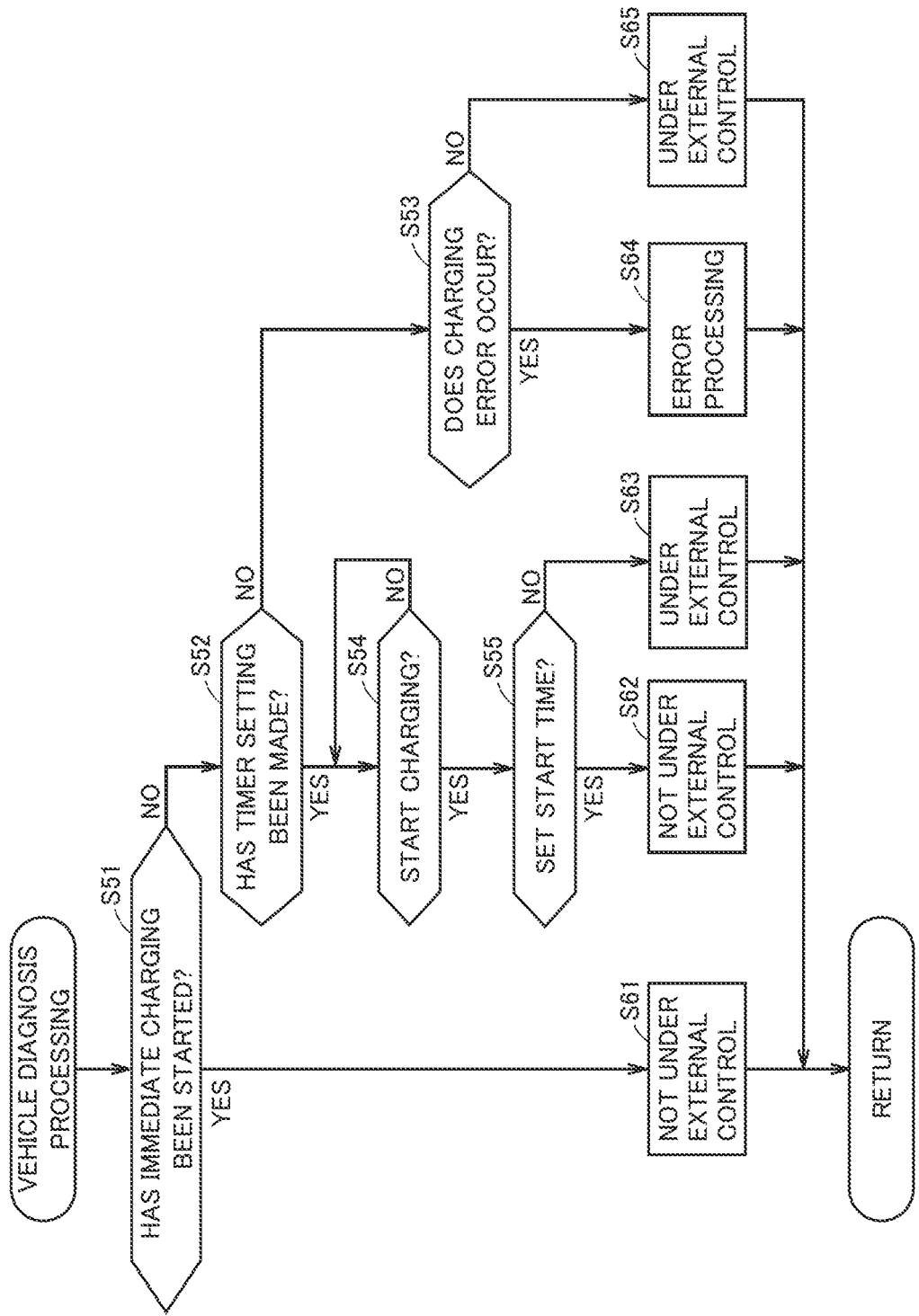
FIG. 9 is a flowchart showing details of vehicle diagnosis processing shown in FIG. 8.

Referring to FIG. 8 together with FIG. 4, in S41, controller 31 performs vehicle diagnosis processing for vehicle 50. FIG. 9 is a flowchart showing details of the vehicle diagnosis processing (processing involved with S41 in FIG. 8).

Referring to FIG. 9 together with FIG. 4, in S51, first determination unit 311 determines whether or not immediate charging has been started in vehicle 50. When determination as NO (that is, immediate charging not being carried out in vehicle 50) is made in S51, in S52, second determination unit 312 determines whether or not timer-programmed charging has been set in vehicle 50. When determination as NO (that is, timer-programmed charging not having been set in vehicle 50) is made in S52, in S53, error determination unit 314 determines whether or not the charging error occurs in vehicle 50.

When determination as YES (that is, vehicle 50 carrying out immediate charging) is made in S51, in S61, third determination unit 313 makes determination as "not under external control."

When determination as YES (that is, timer-programmed charging having been set in vehicle 50) is made in S52, in S54, third determination unit 313 determines whether or not charging has been started in vehicle 50. Third determination unit 313 repeats determination in S54 until charging is started in vehicle 50. When charging is started in vehicle 50 (YES in S54), in S55, third determination unit 313 determines whether or not the current time (that is, time when charging has been started) and time to start set timer-programmed charging are the same. When determination as YES (the same) is made in S55, in S62, third determination unit 313 makes determination as "not under external control." When determination as NO (not the same) is made in S55, in S63, third determination unit 313 makes determination as "under external control."

When determination as YES (presence of error) is made in S53, in S64, error processing unit 304 performs prescribed error processing. For example, error processing unit 304 has contents of the charging error recorded in storage 32 in association with the ID of vehicle 50 (vehicle ID) and notifies portable terminal 80 carried by the user of vehicle 50 of occurrence of the charging error. When determination as NO (absence of error) is made in S53, in S65, third determination unit 313 makes determination as "under external control." A result of determination (not under external control/under external control) in each of S61 to S63 and S65 is stored in storage 32 in association with the ID of vehicle 50 (vehicle ID).

When processing in any of S61 to S65 is performed, the process proceeds to S42 in FIG. 8. Referring again to FIG. 8 together with FIG. 4, in S42, selector 303 obtains the current position (that is, the charging location) of vehicle 50 from vehicle information stored in storage 32. Thereafter, in S43, selector 303 updates priority information in storage 32.

Figures 10, 11:
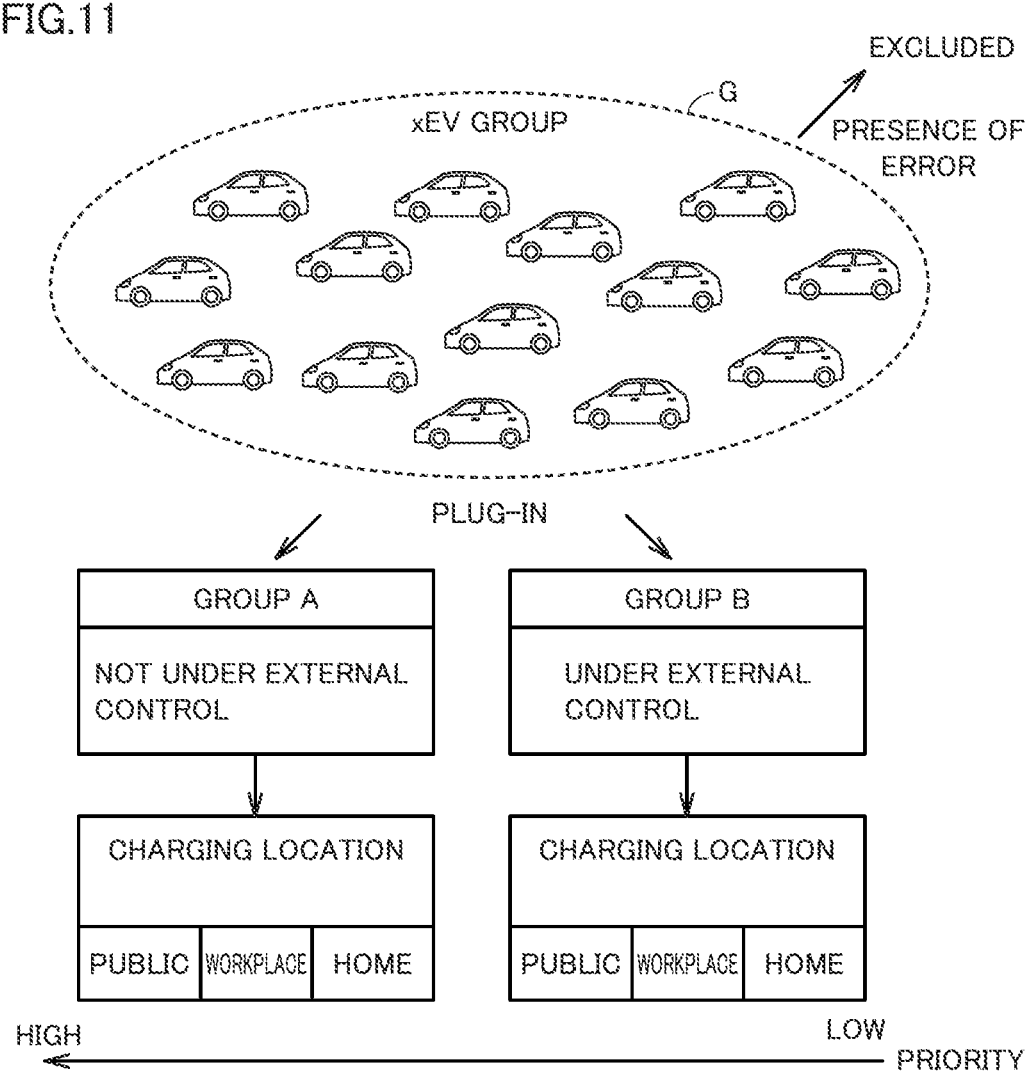
FIG. 10 is a diagram showing priority information according to the first embodiment of the present disclosure.
FIG. 11 is a diagram for illustrating processing for updating priority information shown in FIG. 8.

FIG. 10 is a diagram showing exemplary priority information. Referring to FIG. 10, priority information categorizes xEVs included in group G into xEVs to be excluded and xEVs not to be excluded. Priority information indicates priority of each xEV that is not excluded. An xEV higher in priority is more likely to be selected as the VPP cooperative vehicle. The excluded xEV is not selected as the VPP cooperative vehicle. "ID-\*" in FIG. 10 represents the vehicle ID.

FIG. 11 is a diagram for illustrating processing for updating priority information (processing involved with S43 in FIG. 8). Referring to FIG. 11, selector 303 excludes an xEV for which determination as "presence of error" is made in S53 in FIG. 9 from candidates for the VPP cooperative vehicle. Selector 303 categorizes an xEV for which determination as "not under external control" is made in S61 or S62 in FIG. 9 into a group A and an xEV for which determination as "under external control" is made in S63 or S65 in FIG. 9 into a group B. Selector 303 sets priority of group A to be higher than priority of group B. Furthermore, xEVs in each group (group A/group B) are given priority based on the charging location (S42 in FIG. 8). In this embodiment, selector 303 determines the priority based on which of home of the vehicle user, the workplace of the vehicle user, and a public location (a location other than the home and the workplace) the charging location falls under. The xEV the charging location of which falls under the workplace is higher in priority than the xEV the charging location of which falls under the home. The xEV the charging location of which falls under the public location is higher in priority than the xEV the charging location of which falls under the workplace.

In this embodiment, priority is set as low/intermediate/high, with the charging location being categorized into home/workplace/public. How to determine the priority based on the charging location, however, is not limited as above. Server 30A may obtain charging history data (for example, data representing a frequency of external control for each charging location) from each xEV included in group G. Then, server 30A may evaluate probability of external control for each charging location based on the charging history data. The charging location where probability of external control is high is different for each xEV. Therefore, server 30A may evaluate the charging location for each xEV. Server 30A may set the priority of the xEV located at the charging location where probability of external control is high to be lower than the priority of the xEV located at the charging location where probability of external control is low.

Referring again to FIG. 8 together with FIG. 4, after processing for updating priority information (S43), in S44, information manager 501 determines whether or not the subject vehicle is under external control based on the result in third determination (FIG. 9). When the subject vehicle is under external control (YES in S44), in S45, information manager 501 performs notification processing. For example, information manager 501 has the touch panel display of portable terminal 80 carried by the user of the subject vehicle show a prescribed message. The prescribed message may be a message M (FIG. 8) calling for attention, such as "another device has logged in." Notification processing may be performed using voice and sound, without being limited to representation. As the processing in S45 is performed, a series of processing shown in FIG. 8 ends. When the subject vehicle is not under external control (NO in S44), the series of processing shown in FIG. 8 ends without notification processing (S45) being performed.

Figure 12:
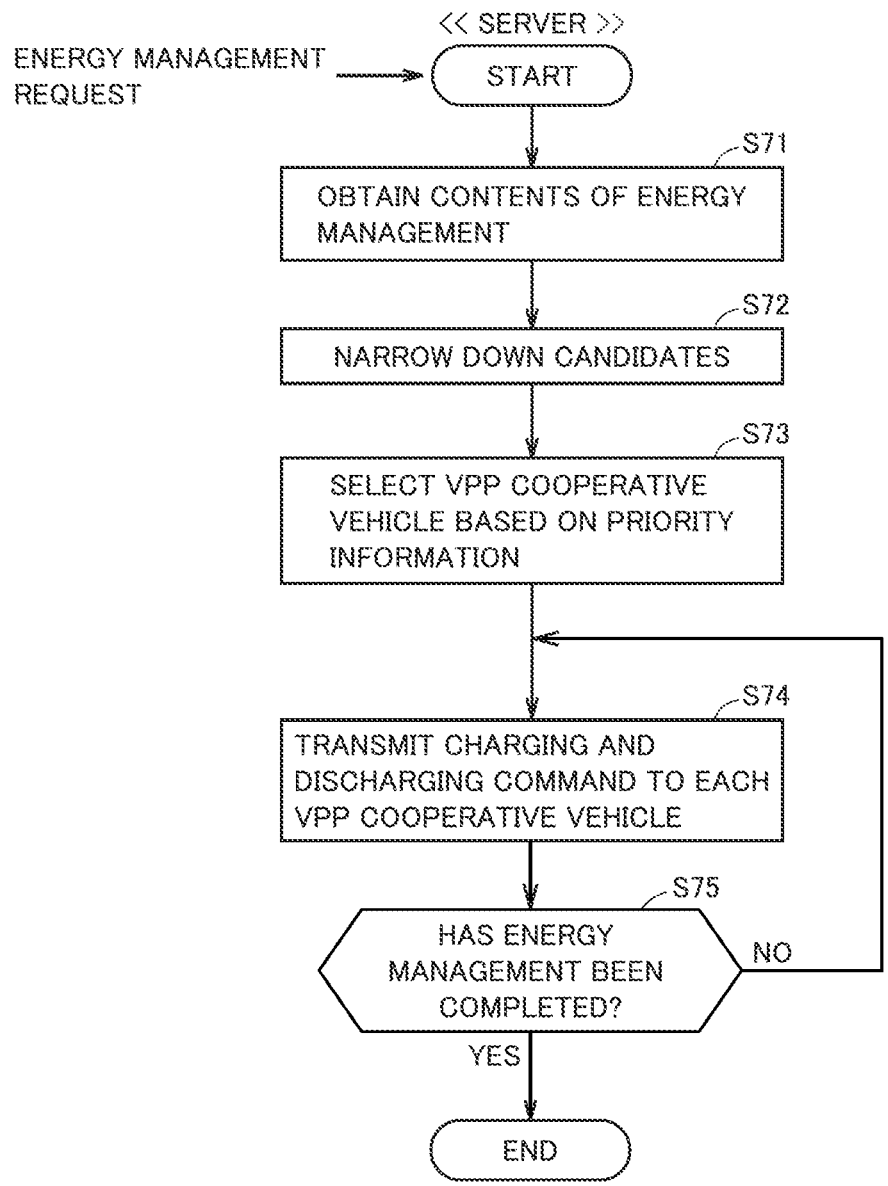
FIG. 12 is a flowchart showing processing involved with external control (charging and discharging control) carried out under remote control by the server according to the first embodiment of the present disclosure.

FIG. 12 is a flowchart showing processing involved with external control (charging and discharging control) carried out under remote control by server 30A. Processing shown in this flowchart is started, for example, when server 30A receives a request for energy management from server 20 (FIG. 3).

Referring to FIG. 12 together with FIG. 4, in S71, selector 303 obtains contents of requested energy management. The contents of energy management include a region of interest, a type of energy management (for example, demand creation, demand suppression, backfeeding, or frequency regulation), a power adjustment amount, and a power adjustment period.

In S72, selector 303 narrows down candidates for the VPP cooperative vehicle (which are also referred to as "selection candidates" below). More specifically, selector 303 excludes an xEV not suitable for energy management from the selection candidates among xEVs included in group G (initial selection candidates). For example, in energy management in which a request for charging of the power storage (demand creation) is issued to the xEV, an xEV the power storage of which is fully charged is excluded from the selection candidates. Selector 303 may give an advance notice to a vehicle user before selection of the VPP cooperative vehicle. When the vehicle user indicates his/her intention not to participate in energy management, selector 303 may exclude the xEV belonging to that vehicle user from the selection candidates.

In S73, selector 303 selects the VPP cooperative vehicle from among the selection candidates narrowed down in S72. Selector 303 selects a prescribed target number of VPP cooperative vehicles in accordance with priority indicated in the priority information (see FIG. 10) in storage 32. The prescribed target number is set, for example, to the number of vehicles with which requested energy management can be achieved. Selector 303 selects the VPP cooperative vehicle from among xEVs in the descending order of priority. When selector 303 selects the VPP cooperative vehicle from among a plurality of xEVs equal in priority, it may randomly select the VPP cooperative vehicle. From a plurality of xEVs equal in priority in group A shown in FIG. 11, selector 303 according to this embodiment selects preferentially as the VPP cooperative vehicle, an xEV shorter in time elapsed since determination as "not under external control" was made (that is, a difference between time when determination as "not under external control" was made and the current time).

In S74, charging and discharging control unit 302 transmits a charging and discharging command to each VPP cooperative vehicle selected in S73. The charging and discharging command is transmitted from server 30A to each VPP cooperative vehicle through wireless communication. Charging and discharging control unit 302 remotely controls each VPP cooperative vehicle in accordance with this charging and discharging command. When charging and discharging control unit 302 transmits the charging and discharging command to each VPP cooperative vehicle, each VPP cooperative vehicle carries out charging and discharging control of the power storage in accordance with the charging and discharging command through the processing shown in FIG. 7 (S32 in FIG. 7).

In S75, charging and discharging control unit 302 determines whether or not requested energy management has been completed. Charging and discharging control unit 302 may determine that energy management has been completed when a period for requested power adjustment expires. Transmission (S74) of the charging and discharging command is continued until energy management is completed. When energy management is completed (YES in S75), a series of processing shown in FIG. 12 ends. The charging and discharging command is thus no longer transmitted from server 30A to each VPP cooperative vehicle, and each VPP cooperative vehicle stops charging and discharging control of the power storage in accordance with the charging and discharging command (NO in S31 in FIG. 7).

As described above, the vehicle diagnosis method according to the first embodiment includes first determination, second determination, error determination, and third determination. In first determination, when the subject vehicle including the power storage enters the chargeable state in which it can receive power feed from EVSE (a power feed facility outside the vehicle), whether or not charging of the power storage is started in the subject vehicle is determined (S51 in FIG. 9). In second determination, whether or not timer-programmed charging has been set in the subject vehicle that has entered chargeable state is determined (S52 in FIG. 9). In error determination, whether or not the charging error that impedes charging of the power storage occurs in the subject vehicle is determined (S53 in FIG. 9). In third determination, whether or not charging and discharging control of the power storage is carried out under remote control in the subject vehicle is determined based on a determination result in at least one of first determination, second determination, and error determination (S61 to S63 and S65 in FIG. 9). According to such a vehicle diagnosis method, whether or not the subject vehicle is under external control can be diagnosed. When the subject vehicle is determined in third determination as already being under another external control operation (for example, external control by server 30B), by not allowing server 30A to carry out external control on the subject vehicle, two or more simultaneous external control (remote control) operations performed on the subject vehicle can be suppressed.

Figure 13:
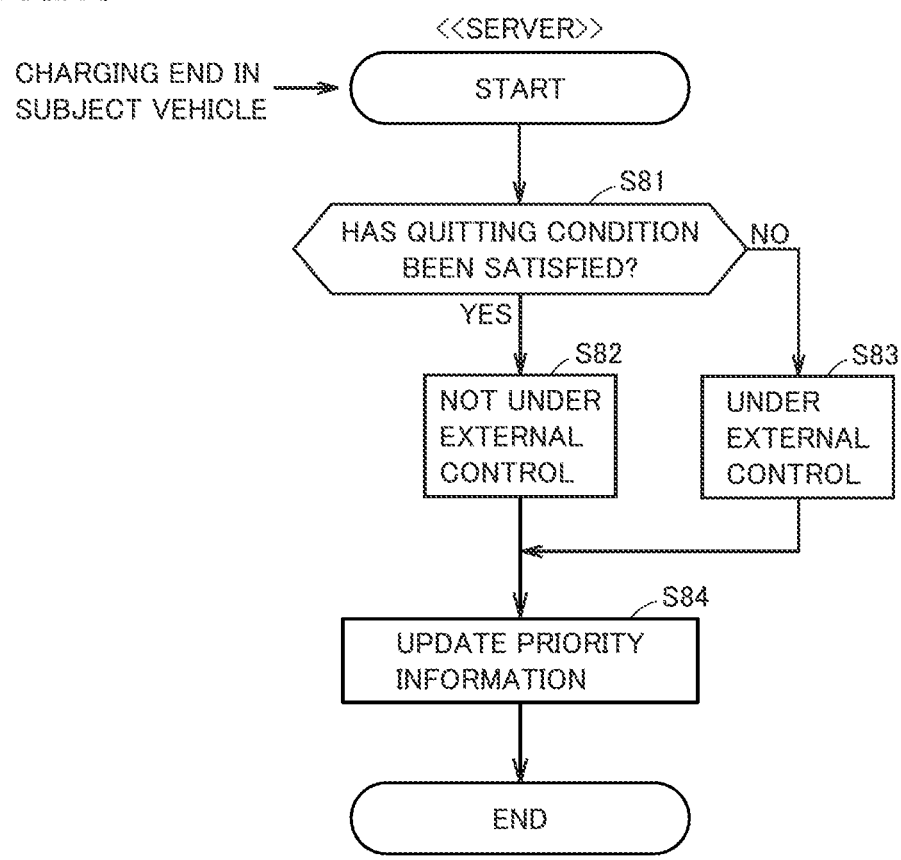
FIG. 13 is a flowchart showing vehicle diagnosis processing performed when charging ends in a subject vehicle in which timer-programmed charging has been set in a modification of the first embodiment.

Server 30A may perform vehicle diagnosis processing when charging ends in the subject vehicle in which timer-programmed charging has been set. FIG. 13 is a flowchart showing exemplary vehicle diagnosis processing performed when charging ends in the subject vehicle in which timer-programmed charging has been set. Referring to FIG. 13 together with FIG. 4, when charging ends in the subject vehicle for which determination as YES (that is, timer-programmed charging having been set in vehicle 50) is made in second determination, in S81, third determination unit 313 determines whether or not the charging quitting condition (S23 in FIG. 6) for quitting timer-programmed charging set in the subject vehicle is satisfied. When determination as YES (satisfied) is made in S81, in S82, third determination unit 313 makes determination as "not under external control." When determination as NO (not satisfied) is made in S81, in S83, third determination unit 313 makes determination as "under external control." Thereafter, in S84, selector 303 updates priority information in storage 32. The method of updating priority information in S84 is the same as in S43 in FIG. 8 (see FIG. 11). Processing in S81 to S83 in FIG. 13 corresponds to vehicle diagnosis processing. In this example, when determination as YES is made in second determination and when charging of the power storage ends in the subject vehicle without the condition for quitting set timer-programmed charging being satisfied, third determination unit 313 determines that charging and discharging control of the power storage is carried out under remote control in the subject vehicle. According to such a configuration, whether or not the subject vehicle is under external control can highly accurately be diagnosed.

When the number of xEVs for energy management is insufficient in the first embodiment, server 30A may wait for an xEV included in group G entering the chargeable state. Then, server 30A may perform vehicle diagnosis processing on the xEV that has entered the chargeable state, and carry out energy management with that xEV by externally controlling (remotely controlling) the xEV determined as "not under external control." Server 30A may perform processing shown in FIG. 14 which will be described below, instead of the processing shown in FIG. 12.

Figure 14:
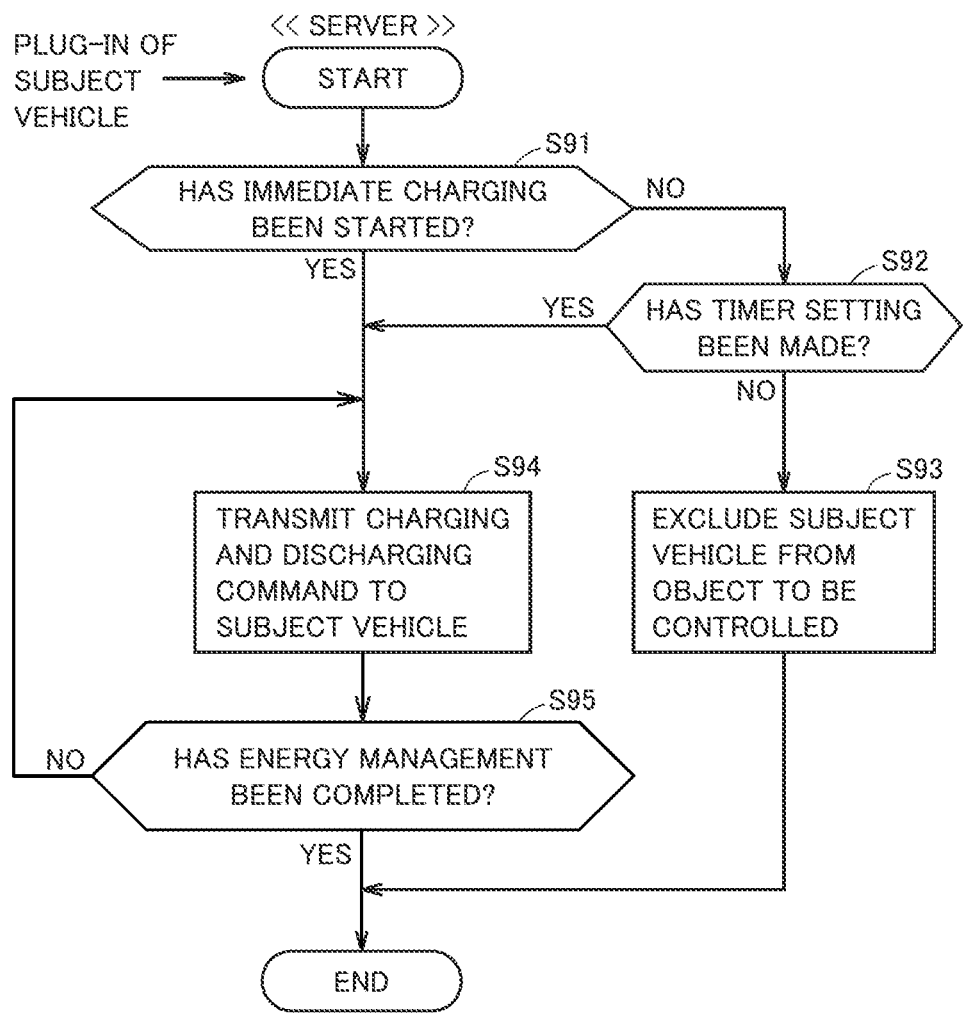
FIG. 14 is a flowchart showing a modification of the processing shown in FIG. 12.

FIG. 14 is a flowchart showing a modification of the processing shown in FIG. 12. Processing shown in this flowchart is started when any of xEVs included in group G enters the chargeable state. In processing below, the xEV that has entered the chargeable state is defined as the subject vehicle.

Referring to FIG. 14 together with FIG. 4, in S91, first determination unit 311 determines whether or not immediate charging has been started in the subject vehicle. When determination as NO is made in S91, in S92, second determination unit 312 determines whether or not timer-programmed charging has been set in the subject vehicle. When determination as NO is made in S92, in S93, charging and discharging control unit 302 excludes the subject vehicle from an object to be controlled (that is, an object to be under external control by server 30A). The subject vehicle is thus withdrawn from present energy management. In this case, server 30A carries out energy management with another vehicle. Therefore, in present energy management, external control by server 30A on the subject vehicle is not carried out.

When determination as YES is made in any of S91 and S92, in S94, charging and discharging control unit 302 transmits the charging and discharging command to the subject vehicle. In S95, charging and discharging control unit 302 determines whether or not energy management has been completed. Processing in S94 and S95 is in conformity with S74 and S75 in FIG. 12.

Server 30A according to the modification is configured to exclude a vehicle in which charging of the power storage mounted thereon is not started even when it enters the chargeable state while timer-programmed charging has not been set (that is, the subject vehicle for which determination as NO is made in both of S91 and S92) from an object to be under charging and discharging control under remote control. According to such a configuration, interference between two or more remote control operations and a malfunction in external control due to a charging error are suppressed.

In the modification, third determination unit 313 may determine whether or not charging and discharging control of the power storage is carried out under remote control in the subject vehicle based on a determination result in each of S91 and S92. More specifically, when determination as NO is made in S92, third determination unit 313 may determine the subject vehicle as being "under external control," and when determination as YES is made in any of S91 and S92, it may determine the subject vehicle as being "not under external control." In such a configuration, when determination as "not under external control" is made in third determination, charging and discharging control unit 302 carries out charging and discharging control of the power storage of the subject vehicle under remote control through wireless communication with the wireless communication device of the subject vehicle (S94). When determination as "under external control" is made in third determination, charging and discharging control unit 302 does not carry out charging and discharging control of the power storage under remote control (S93). Server 30A configured as such can carry out charging and discharging control of the power storage under remote control in the subject vehicle while interference with another remote control operation is avoided.

The first embodiment and various modifications may be carried out as being combined in any manner. For example, controller 31 may accept an input from a user so as to allow the user to adopt any control mode. Controller 31 may be configured to allow the user to select any of control shown in FIG. 12 (a first control mode) and control shown in FIG. 14 (a second control mode) through input apparatus 34.

The function in vehicle diagnosis processing described above may be implemented in server 30B (FIG. 3).

Second Embodiment

A vehicle according to a second embodiment of the present disclosure will be described. Since the second embodiment is mostly identical to the first embodiment, differences will mainly be described and description of components in common is not provided.

Figure 15:
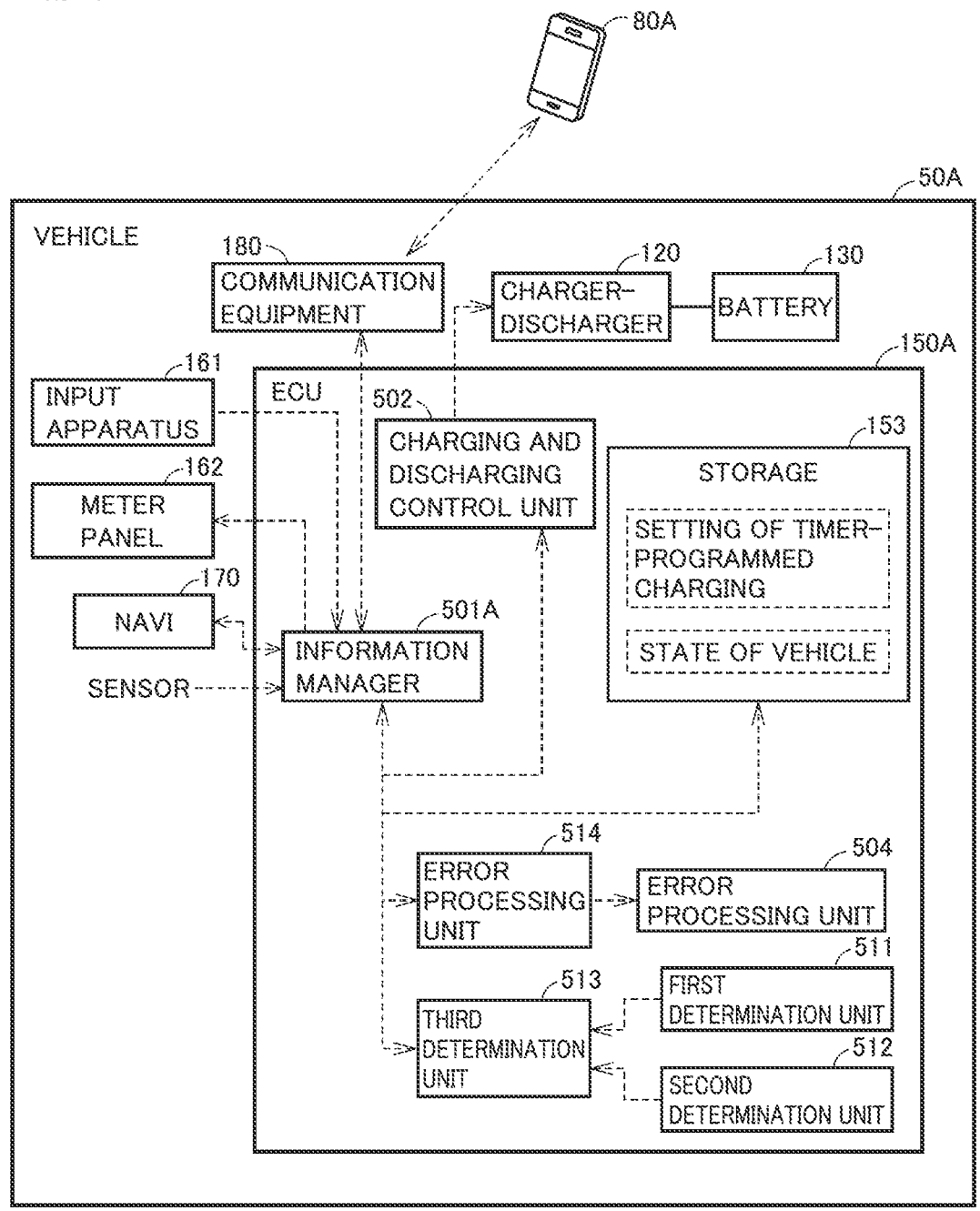
FIG. 15 is a diagram showing a detailed configuration of a controller mounted on a vehicle according to a second embodiment of the present disclosure.

The function involved with vehicle diagnosis processing implemented in the server in the first embodiment may be implemented in the vehicle. FIG. 15 is a diagram showing a detailed configuration of an ECU 150A mounted on a vehicle 50A according to the second embodiment. ECU 150A corresponds to an exemplary "controller" according to the present disclosure.

Referring to FIG. 15, vehicle 50A according to the second embodiment is identical in configuration to vehicle 50 (FIGS. 1 and 4) according to the first embodiment except for including ECU 150A instead of ECU 150 (FIG. 3). ECU 150A further includes an error processing unit 504, a first determination unit 511, a second determination unit 512, a third determination unit 513, and an error determination unit 514 in addition to components of ECU 150 shown in FIG. 4. Error processing unit 504, first determination unit 511, second determination unit 512, third determination unit 513, and error determination unit 514 are similar in function to error processing unit 304, first determination unit 311, second determination unit 312, third determination unit 313, and error determination unit 314 (FIG. 4) mounted on server 30A in the first embodiment, respectively. A result in third determination is stored in storage 153.

ECU 150A includes an information manager 501A instead of information manager 501 (FIG. 4). Information manager 501A controls a terminal of a user of vehicle 50A to be notified of the fact that vehicle 50A is remotely controlled when third determination unit 513 determines vehicle 50A as being "under external control." The terminal of the user of vehicle 50A is registered in advance in ECU 150A. The terminal of the user of vehicle 50A is, for example, at least one of meter panel 162, NAVI 170, and a portable terminal 80A carried by the user of vehicle 50A.

Charging and discharging control unit 502 is configured to carry out charging control shown in FIGS. 5 to 7 as in the first embodiment. In other words, while timer-programmed charging has not been set in vehicle 50A, charging and discharging control unit 502 starts charging of battery 130 at the time when vehicle 50A enters the chargeable state in which power feed from EVSE (a power feed facility outside the vehicle) can be received, and while timer-programmed charging has been set in vehicle 50A, charging and discharging control unit 502 starts charging of battery 130 at the time when time to start set timer-programmed charging comes. Charging and discharging control unit 502 corresponds to an exemplary "charging control unit" according to the present disclosure.

Figure 16:
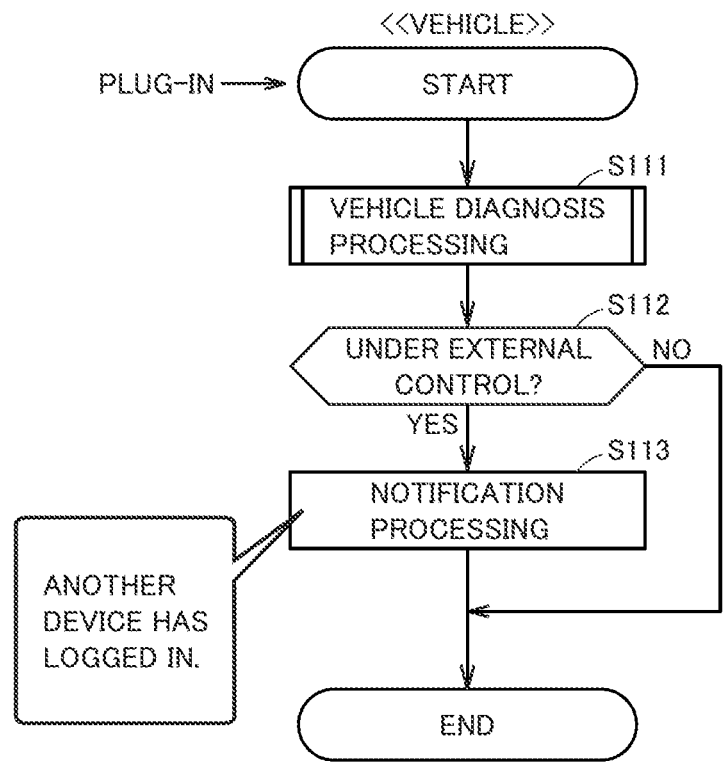
FIG. 16 is a flowchart showing notification processing performed by the controller of the vehicle according to the second embodiment of the present disclosure.

FIG. 16 is a flowchart showing notification processing performed by ECU 150A of vehicle 50A according to the second embodiment. Processing shown in this flowchart is started when vehicle 50A enters the chargeable state.

Referring to FIG. 16 together with FIG. 15, in S11, ECU 150A performs the vehicle diagnosis processing shown in FIG. 9. In the processing shown in FIG. 9, however, S51 is performed by first determination unit 511, S52 is performed by second determination unit 512, and S53 is performed by error determination unit 514. S54, S55, S61 to S63, and S65 are performed by third determination unit 513. ECU 150A may transmit at least one of a result in third determination and a result in error determination to an external server (for example, server 30). Server 30 may update priority information with at least one of the result in third determination and the result in error determination received from vehicle 50A. In S64, for example, error processing unit 504 has contents of a charging error recorded in storage 153 (logging of abnormality) and notifies the terminal of the user of vehicle 50A of occurrence of the charging error. For example, error processing unit 504 may have meter panel 162 show a warning indicator that indicates occurrence of the charging error.

In S112, information manager 501A determines whether or not vehicle 50A is under external control based on the result in third determination (FIG. 9). When vehicle 50A is under external control (YES in S112), in S113, information manager 501A controls the terminal of the user of vehicle 50A to be notified of the fact that vehicle 50A is remotely controlled. The terminal of the user of vehicle 50A may give the user of vehicle 50A, for example, a message calling for attention such as "another device has logged in" by representation and/or voice and sound. As processing in S113 is performed, a series of processing shown in FIG. 16 ends. When vehicle 50A is not under external control (NO in S112), the series of processing shown in FIG. 16 ends without notification processing (S113) being performed.

In vehicle 50A according to the second embodiment, when determination as "under external control" is made in third determination, the terminal of the user of vehicle 50A is notified of the fact that vehicle 50A is under remote control (S113). The user thus readily knows whether or not vehicle 50A is remotely controlled.

Figure 17:
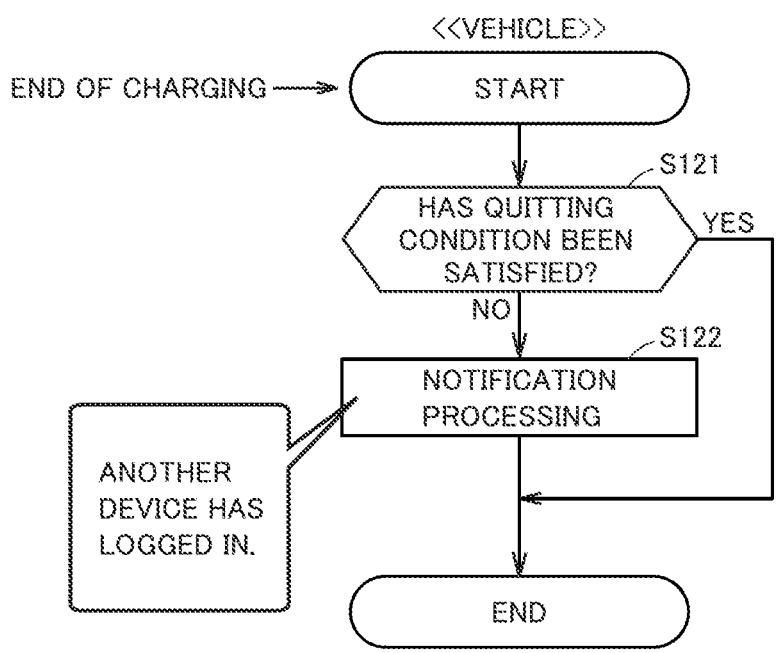
FIG. 17 is a flowchart showing vehicle diagnosis processing performed by the controller of the vehicle in a state that timer-programmed charging has been set therein in a modification of the second embodiment.

ECU 150A may perform vehicle diagnosis processing when charging ends in vehicle 50A in which timer-programmed charging has been set. FIG. 17 is a flowchart showing exemplary vehicle diagnosis processing performed by ECU 150A in a state that timer-programmed charging has been set in vehicle 50A. Referring to FIG. 17 together with FIG. 15, when charging of battery 130 ends in vehicle 50A for which determination as YES (timer-programmed charging having been set) is made in second determination, in S121, information manager 501A determines whether or not the charging quitting condition for quitting timer-programmed charging set in vehicle 50A (S23 in FIG. 6) is satisfied. When determination as NO (not satisfied) is made in S121, in S122, information manager 501A controls the terminal of the user of vehicle 50A to be notified that vehicle 50A is remotely controlled. Notification processing in S122 is the same, for example, as in S113 in FIG. 16. As processing in S122 is performed, a series of processing shown in FIG. 17 ends. When determination as YES (satisfied) is made in S121, the series of processing shown in FIG. 17 ends without notification processing (S122) being performed. In this example, when determination as YES is made in second determination and when charging of battery 130 ends without the condition for quitting set timer-programmed charging being satisfied, information manager 501A performs notification processing (S122). According to such a configuration, the user readily knows whether or not the vehicle is remotely controlled.

At least some of functions involved with vehicle diagnosis processing implemented in vehicle 50A in the second embodiment may be implemented in portable terminal 80A.

Another Embodiment

The electric power company may be divided for each business sector. A power generation utility and a power transmission and distribution utility may belong to companies different from each other. One aggregator may serve as both of the parent aggregator and the resource aggregator. The server may receive a request for energy management from a power market. The server that performs vehicle diagnosis processing is not limited to an aggregator server and any server that can communicate with a vehicle is applicable.

A configuration of the vehicle is not limited to the configuration shown in FIG. 1. For example, the vehicle may be capable only of external charging, of external charging and external power feed. The vehicle may be configured to be wirelessly chargeable. The vehicle is not limited to a passenger car, and a bus or a truck may be applicable. The vehicle is not limited to a BEV, and a PHEV may be applicable. The vehicle may be an autonomous vehicle or may perform a flying function. The vehicle may be a vehicle that can travel without human intervention (for example, an automated guided vehicle (AGV) or an agricultural implement).

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A server comprising:
a first determination unit that determines, when a subject vehicle including a power storage enters a chargeable state in which power feed from a power feed facility outside the subject vehicle can be received, whether charging of the power storage is started in the subject vehicle;
a second determination unit that determines whether timer-programmed charging has been set in the subject vehicle that has entered the chargeable state;
a third determination unit that determines whether charging and discharging control of the power storage is being carried out under remote control in the subject vehicle based on at least one of a result of determination by the first determination unit and a result of determination by the second determination unit; and
a charging and discharging control unit, wherein
a wireless communication device is mounted on the subject vehicle,
the server wirelessly communicates with the subject vehicle through the wireless communication device,
when the third determination unit determines that charging and discharging control of the power storage is not being carried out under remote control in the subject vehicle, the charging and discharging control unit carries out charging and discharging control of the power storage under remote control through wireless communication with the wireless communication device, and
when the third determination unit determines that charging and discharging control of the power storage is being carried out under remote control in the subject vehicle, the charging and discharging control unit does not carry out the charging and discharging control of the power storage under the remote control.

2. The server according to claim 1, wherein
when the first determination unit determines that the charging is started at time when the subject vehicle enters the chargeable state, the third determination unit determines that charging and discharging control of the power storage is not being carried out under remote control in the subject vehicle.

3. The server according to claim 1, wherein
when the second determination unit determines that timer-programmed charging has been set in the subject vehicle that has entered the chargeable state and charging of the power storage is started at time which is not time to start set timer-programmed charging, the third determination unit determines that charging and discharging control of the power storage is being carried out under remote control in the subject vehicle.

4. The server according to claim 1, wherein
when the second determination unit determines that timer-programmed charging has been set in the subject vehicle that has entered the chargeable state and charging of the power storage ends without a condition for quitting set timer-programmed charging being satisfied, the third determination unit determines that charging and discharging control of the power storage is being carried out under remote control in the subject vehicle.

5. A server comprising:
a first determination unit that determines, when a subject vehicle including a power storage enters a chargeable state in which power feed from a power feed facility outside the subject vehicle can be received, whether charging of the power storage is started in the subject vehicle;
a second determination unit that determines whether timer-programmed charging has been set in the subject vehicle that has entered the chargeable state;
a third determination unit that determines whether charging and discharging control of the power storage is being carried out under remote control in the subject vehicle based on at least one of a result of determination by the first determination unit and a result of determination by the second determination unit; and
an error determination unit that determines whether a charging error that impedes charging of the power storage occurs in the subject vehicle, wherein
when a prescribed condition is satisfied, the third determination unit determines that charging and discharging control of the power storage is being carried out under remote control in the subject vehicle, and
the prescribed condition includes
a condition that the first determination unit determines that the charging is not started at time when the subject vehicle enters the chargeable state,
a condition that the second determination unit determines that timer-programmed charging has not been set in the subject vehicle that has entered the chargeable state, and
a condition that the error determination unit determines that no charging error occurs in the subject vehicle.

6. The server according to claim 5, further comprising an error processing unit that performs, when the error determination unit determines that the charging error occurs, at least one of issuance of a notification and making of a record regarding occurrence of the charging error.

7. The server according to claim 5, further comprising:
a selector; and
a charging and discharging control unit, wherein
the server wirelessly communicates with a plurality of vehicles,
each of the plurality of vehicles includes a power storage and a wireless communication device,
the selector selects one or more vehicles from among the plurality of vehicles,
the charging and discharging control unit carries out charging and discharging control of the power storage of each vehicle selected by the selector, under remote control through wireless communication with the wireless communication device,
the selector preferentially selects a vehicle for which determination that charging and discharging control of the power storage is not being carried out under remote control is made by the third determination unit, over a vehicle for which determination that charging and discharging control of the power storage is being carried out under remote control is made by the third determination unit, and
the selector does not select a vehicle for which determination that the charging error occurs is made by the error determination unit.

8. The server according to claim 7, wherein
when there are a plurality of vehicles for which determination that charging and discharging control of the power storage is not being carried out under remote control is made by the third determination unit, the selector places higher priority in selection on a vehicle shorter in time elapsed since determination that charging and discharging control of the power storage is not being carried out under remote control was made.

9. The server according to claim 7, wherein
when there are a plurality of vehicles for which determination that charging and discharging control of the power storage is not being carried out under remote control is made by the third determination unit, the selector sets priority in selection for the plurality of vehicles based on a charging location for each of the plurality of vehicles.

* * * * *